US012106923B2

(12) United States Patent
Jang et al.

(10) Patent No.: US 12,106,923 B2
(45) Date of Patent: Oct. 1, 2024

(54) ARC BOX AND ELECTROMAGNETIC CONTACTOR COMPRISING SAME

(71) Applicant: LS ELECTRIC CO., LTD., Anyang-Si (KR)

(72) Inventors: Kyeonghun Jang, Anyang-si (KR); Minseok Kim, Anyang-si (KR); Deokyong Yun, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 130 days.

(21) Appl. No.: 17/756,945

(22) PCT Filed: Apr. 9, 2020

(86) PCT No.: PCT/KR2020/004808
§ 371 (c)(1),
(2) Date: Jun. 6, 2022

(87) PCT Pub. No.: WO2021/112342
PCT Pub. Date: Jun. 10, 2021

(65) Prior Publication Data

US 2023/0033798 A1 Feb. 2, 2023

(30) Foreign Application Priority Data

Dec. 6, 2019 (KR) ........................ 10-2019-0161885

(51) Int. Cl.
*H01H 9/34* (2006.01)
*H01H 50/14* (2006.01)
*H01H 50/60* (2006.01)

(52) U.S. Cl.
CPC .............. *H01H 9/34* (2013.01); *H01H 50/14* (2013.01); *H01H 50/60* (2013.01); *H01H 2009/347* (2013.01)

(58) Field of Classification Search
CPC .......... H01H 9/34; H01H 9/345; H01H 9/362; H01H 2009/347; H01H 2009/365;
(Continued)

(56) References Cited

U.S. PATENT DOCUMENTS 6,191,377 B1 2/2001 Roesner et al.
6,317,019 B1 * 11/2001 Herpin ............... H01H 71/1009 335/8
(Continued)

FOREIGN PATENT DOCUMENTS

JP S5297241 U 7/1977
JP S5544708 U 3/1980
(Continued)

OTHER PUBLICATIONS

International Search Report for related International Application No. PCT/KR2020/004808; report dated Jun. 10, 2021; (6 pages).
(Continued)

*Primary Examiner* — William A Bolton
(74) *Attorney, Agent, or Firm* — K&L Gates LLP

(57) ABSTRACT

An arc box and an electromagnetic contactor comprising same are disclosed. The arc box according to an embodiment of the present disclosure comprises a coupling protrusion. The coupling protrusion is inserted into and coupled to a grid coupling hole of an arc chamber. Therefore, the arc chamber can be stably coupled to the arc box. In one embodiment, the coupling can be performed through snap fastening. Therefore, the arc chamber and the arc box can be easily coupled. A rib part is formed on the arc box. The rib part is positioned to be adjacent to the coupled arc chamber so as to prevent pitching of the arc chamber. Therefore, the arc chamber coupled to the arc box can stably maintain a stopping state.

12 Claims, 17 Drawing Sheets

(58) Field of Classification Search

CPC ...... H01H 50/14; H01H 50/60; H01H 50/045; H01H 50/546; H01H 49/00

USPC .. 218/155, 156, 157, 15, 30, 31, 34, 35, 38, 218/46, 47, 149; 335/201, 202

See application file for complete search history.

(56) References Cited

U.S. PATENT DOCUMENTS

| | | | | |
|---|---|---|---|---|
| 7,915,985 | B2 * | 3/2011 | Schmitz | H01H 9/443 335/201 |
| 8,427,262 | B2 * | 4/2013 | Choi | H01H 50/045 335/132 |
| 8,502,102 | B2 * | 8/2013 | Eriksson | H01H 33/182 218/150 |
| 9,583,292 | B2 * | 2/2017 | Larcher | H01H 50/545 |
| 10,056,210 | B2 * | 8/2018 | Marzano | H01H 9/362 |
| 10,128,069 | B1 * | 11/2018 | Ruempler | H01H 9/362 |
| 10,192,700 | B2 * | 1/2019 | Rival | H01H 33/10 |
| 10,224,162 | B2 * | 3/2019 | Graefenhahn | H01H 33/08 |
| 2004/0056750 | A1 | 3/2004 | Kawata et al. | |
| 2007/0056931 | A1 | 3/2007 | Turkmen | |
| 2011/0133870 | A1 * | 6/2011 | Annis | H01H 9/446 335/205 |
| 2015/0061797 | A1 * | 3/2015 | Yeon | H01H 50/16 335/194 |
| 2015/0325397 | A1 | 11/2015 | Larcher et al. | |

FOREIGN PATENT DOCUMENTS

| | | | |
|---|---|---|---|
| JP | H09171760 | A | 6/1997 |
| JP | H11242924 | A | 9/1999 |
| JP | 2000513495 | A | 10/2000 |
| JP | 2016072020 | A | 5/2016 |
| KR | 1019970067432 | A | 10/1997 |
| KR | 20100080087 | A | 7/2010 |
| KR | 101024811 | B1 | 3/2011 |
| KR | 20140012129 | A | 1/2014 |
| KR | 101513209 | B1 | 4/2015 |
| KR | 20180091431 | A | 8/2018 |
| KR | 20180124825 | A | 11/2018 |

OTHER PUBLICATIONS

Written Opinion for related International Application No. PCT/KR2020/004808; report dated Jun. 10, 2021; (6 pages).

Notice of Allowance for related Korean Application No. 10-2019-0161885; action dated Dec. 6, 2021; (4 pages).

Office Action for related Korean Application No. 10-2019-0161885; action dated Dec. 6, 2021; (5 pages).

Office Action for related Japanese Application No. 2022-530652; action dated Jun. 27, 2023; (4 pages).

Extended European Search Report for related European Application No. 20897184.6; action dated Nov. 22, 2023; (13 pages).

Office Action for related Chinese Application No. 202080084094.9; action dated Apr. 30, 2024; (7 pages).

* cited by examiner

ARC BOX AND ELECTROMAGNETIC CONTACTOR COMPRISING SAME

CROSS-REFERENCE TO RELATED APPLICATIONS

This application is the National Stage filing under 35 U.S.C. 371 of International Application No. PCT/KR2020/004808, filed on Apr. 9, 2020, which claims the benefit of earlier filing date and right of priority to Korean Application Nos. 10-2019-0161885, filed on Dec. 6, 2019, the contents of which are all hereby incorporated by reference herein in their entirety.

FIELD

The present disclosure relates to an arc box and an electromagnetic contactor including the same, and more particularly, to an arc box having a structure capable of stably coupling an arc chamber and the arc box, and an electromagnetic contactor including the same.

BACKGROUND ART

An electromagnetic contactor is disposed between a power source and a load to prevent damage to the load due to overcurrent.

An electromagnetic contactor includes a coil and a movable core. When a current is applied to the electromagnetic contactor, the movable core is attracted toward a fixed core by a magnetic field that the coil produces.

When the movable core is brought into contact with a fixed contact, the electromagnetic contactor can be electrically connected to outside. Accordingly, the power source, the electromagnetic contactor, and the load can be electrically connected.

When an overcurrent is generated in the electrically-connected state, a fixed contact and a movable contact are separated from each other. The separation proceeds as the movable core connected to the movable contact moves away from the fixed core. To this end, an elastic member for applying elastic force in an upward direction is disposed below the movable core.

By the way, when the fixed contact and the movable contact are separated from each other, a current is cut off and an arc is generated. The arc may be defined as a flow of high-temperature and high-pressure current. Therefore, when the arc remains inside the electromagnetic contactor, there may be a fear that components of the electromagnetic contactor are damaged by the arc.

Accordingly, the electromagnetic contactor is provided with a member for extinguishing the arc. In general, the member is referred to as an "arc extinguishing unit". The arc extinguishing unit is located in a space defined inside the electromagnetic contactor.

As described above, since the arc is the flow of high-temperature and high-pressure current, it is preferable that the arc extinguishing unit is firmly fixed to the electromagnetic contactor. In consideration of productivity, it is also preferable that the arc extinguishing unit is easily fixed to the electromagnetic contactor.

Korean Patent Publication No. 10-1997-0067432 discloses an assembly structure of an arc extinguishing chamber for an electromagnetic contactor. Specifically, the patent literature discloses an assembly structure of an arc extinguishing chamber, capable of facilitating an insertion of a grid part by forming a plurality of protrusions inside the arc extinguishing chamber.

However, the assembly structure of the arc extinguishing chamber for the electromagnetic contactor merely suggests a method for accommodating the grid part in a space. That is, it does not suggest a method for firmly maintaining a coupled state of the grid part accommodated in the space.

Korean Patent Publication No. 10-2014-0012129 discloses a method for assembling an arc extinguishing chamber of an electromagnetic contactor. Specifically, a method for assembling an arc extinguishing chamber of an electromagnetic contactor capable of easily assembling an arc extinguishing chamber even when a fixed contactor has a complicated shape is disclosed.

However, the patent literature also suggests only a method for accommodating a contact mechanism in the arc extinguishing chamber. That is, the patent literature does not suggest a method for accommodating an arc extinguishing unit in the space and a method for stably maintaining the coupled state of the accommodated arc extinguishing unit.

Moreover, those patent literatures are documents that have failed to suggest a method for easily coupling the arc extinguishing unit to the electromagnetic contactor.

Korea Patent Publication No. 10-1997-00067432 (Oct. 13, 1997)

Korea Patent Publication No. 10-2014-0012129 (Jan. 29, 2014)

SUMMARY

The present disclosure describes an arc box having a structure capable of solving those problems, and an electromagnetic contactor having the same.

First, one aspect of the present disclosure is to provide an arc box having a structure in which an arc chamber is firmly coupled to the arc box, and an electromagnetic contactor having the same.

Another aspect of the present disclosure is to provide an arc box having a structure in which an arc chamber can be easily coupled to the arc box, and an electromagnetic contactor having the same.

Still another aspect of the present disclosure is to provide an arc box having a structure in which an arc chamber coupled to the arc box is not arbitrarily separated, and an electromagnetic contactor having the same.

Still another aspect of the present disclosure is to provide an arc box having a structure in which a coupled state between an arc chamber and the arc box can be stably maintained even when an arc is generated or an electromagnetic contactor is moved, and an electromagnetic contactor having the same.

Still another aspect of the present disclosure is to provide an arc box having a structure capable of achieving those aspects while minimizing a structural change, and an electromagnetic contactor having the same.

Still another aspect of the present disclosure is to provide an arc box having a structure capable of effectively extinguishing a generated arc, and an electromagnetic contactor having the same.

In order to achieve those aspects and other advantages of the subject matter disclosed herein, there is provided an arc box that may include a space portion accommodating an arc chamber, a plurality of side walls surrounding the space portion and continuously formed with one another, and a partition disposed inside the space portion to partition the space portion into plural regions. The plurality of side walls may include a first side wall and a second side wall extending in one direction and disposed to face each other, and a third side wall and a fourth side wall that are continuous with the first side wall and the second side wall, respectively, extend in another direction, and are disposed to face each other. The partition may be located between the third side wall and the fourth side wall and extend between the first side wall and the second side wall. A coupling protrusion to which the arc chamber is coupled may protrude toward the space portion from at least one of one side surface of the third side wall, one side surface of the fourth side wall, and one side surface of the partition facing the space portion.

The coupling protrusion of the arc box may include a first surface extending at a predetermined angle with the at least one of the one side surface of the third side wall, the one side surface of the fourth side wall, and one side surface of the partition, and a second surface extending from an end portion of the first surface toward the at least one of the one side surface of the third side wall, the one side surface of the fourth side wall, and the one side surface of the partition.

The predetermined angle formed between the first surface of the arc box and the at least one of the one side surface of the third side wall, the one side surface of the fourth side wall, and the one side surface of the partition may be a right angle.

The second surface of the arc box may extend at a predetermined angle with the first surface, and the predetermined angle may be an acute angle.

The coupling protrusion of the arc box may include a first surface extending at a predetermined angle with the at least one of the one side surface of the third side wall, the one side surface of the fourth side wall, and the one side surface of the partition, and a second surface extending from an end portion of the first surface to be downwardly inclined toward the at least one of the one side surface of the third side wall, the one side surface of the fourth side wall, and the one side surface of the partition.

The arc box may further include a rib portion protruding toward the space portion from the at least one of the one side surface of the third side wall, the one side surface of the fourth side wall, and the one side surface of the partition facing the space portion so as to support the arc chamber, and the rib portion may be located adjacent to the arc chamber.

The rib portion of the arc box may be disposed such that a distance between the rib portion and the first side wall or the second side wall is longer than a distance between the arc chamber and the first side wall or the second side wall.

In order to achieve those aspects and other advantages of the subject matter disclosed herein, there is provided an electromagnetic contactor that may include a fixed contact fixed to a support frame, a movable contact located adjacent to the fixed contact to be brought into contact with or separated from the fixed contact, an arc box having a space portion for accommodating the fixed contact and the movable contact therein, and an arc chamber accommodated in the space portion of the arc box and located adjacent to the fixed contact and the movable contact. The arc box may include a plurality of side walls partially surrounding the space portion and disposed to face each other, and coupling protrusions protruding from the plurality of side walls, respectively, toward the space portion. The arc chamber may include a plurality of grids stacked with being spaced apart from each other by a predetermined distance, support plates coupled to both end portions of the grids, and arc box coupling holes formed through the support plates such that the coupling protrusions are is inserted.

Each of the coupling protrusions of the electromagnetic contactor may include a first surface extending toward the space portion at a predetermined angle with the plurality of side walls, and a second face continuous with the first surface and extending toward the plurality of side walls.

The second surface of the electromagnetic contactor may extend obliquely in a direction toward the fixed contact.

The plurality of side walls of the electromagnetic contactor may include a first side wall and a second side wall extending in one direction and disposed to face each other, and a third side wall and a fourth side wall that are continuous with the first side wall and the second side wall, respectively, extend in another direction, and are disposed to face each other. The arc box may include a partition extending between the first side wall and the second side wall in the space portion to partition the space portion into plural regions. The partition may be provided in plurality spaced apart from each other by a predetermined distance between the third side wall and the fourth side wall. The coupling protrusions may be disposed on one side surface of the third side wall, one side surface of the fourth side wall, and one side surface of each of the plurality of partitions facing the partitioned space portion.

The arc chamber of the electromagnetic contactor may be provided in plurality. The plurality of arc chambers may be disposed in the space portion to be spaced apart from each other by a predetermined distance in a direction in which the partition extends. The coupling protrusion may be provided in plurality. The plurality of coupling protrusions may be disposed in the space portion to be spaced apart from each other by a predetermined distance in a direction in which the partition extends.

The plurality of side walls of the electromagnetic contactor may be provided with rib portions located adjacent to the arc chamber and protruding toward the space portion.

The support plate of the electromagnetic contactor may include a first portion located away from the fixed contact, and a second portion continuous with the first portion and located adjacent the fixed contact, and a width of the first portion may be narrower than a width of the second portion.

The rib portion of the electromagnetic contactor may include a first rib portion located adjacent to one edge of the first portion, and a second rib portion located adjacent to one edge of the second portion, and a distance between the one edge of the first portion and the first rib portion may be shorter than a distance between the one edge of the first portion and the second rib portion.

The plurality of side walls of the electromagnetic contactor may include a first side wall and a second side wall extending in one direction and disposed to face each other, and a third side wall and a fourth side wall that are continuous with the first side wall and the second side wall, respectively, extend in another direction, and are disposed to face each other. The arc chamber may be provided in plurality disposed adjacent to the first side wall and the second side wall, respectively, in the space portion. The rib portion may be located farther from the first side wall or the second side wall than the arc chamber.

According to an implementation, the following effects can be achieved.

First, an arc chamber may be accommodated in a space portion defined inside an arc box. A coupling protrusion may protrude from each of side walls and partitions surrounding the space portion. The arc chamber may be provided with support plates that support grids at both sides. Arc box coupling holes may be formed through the support plates.

When the arc chamber is accommodated in the space portion, the coupling protrusions may be inserted into the arc box coupling holes. In one implementation, the coupling protrusions and the arc box coupling holes may be fitted or snapped to each other.

Accordingly, the arc chamber can be firmly coupled to the arc box.

The coupling protrusion may include a first surface extending horizontally and a second surface that is continuous with the first surface and inclined downwardly, that is, in a direction toward a fixed contact. The support plates of the arc chamber may first be in contact with the second surface located on a lower side. Since the second surface is formed to be inclined, the support plates can be smoothly moved upward.

Accordingly, the arc chamber can be easily coupled to the arc box.

When the coupling protrusion is coupled to the arc box coupling hole, a surface surrounding the arc box coupling hole from an upper side may be brought into contact with the first surface of the coupling protrusion. The first surface may extend perpendicularly or upwardly at an obtuse angle with respect to each side wall or partition surrounding the space portion.

Accordingly, when the coupling protrusion is coupled to the arc box coupling hole, an arbitrary separation of the arc chamber can be prevented by the first surface of the coupling protrusion. This can prevent an arbitrary separation of the arc chamber coupled to the arc box.

Also, a rib portion may be disposed adjacent to the arc chamber. The rib portion may support one side of the support plate of the arc chamber. The rib portion may include a first rib portion in contact with a first portion of the support plate and a second rib portion in contact with a second portion of the support plate.

The first rib portion and the second rib portion may extend by different lengths from different positions depending on a structure of the support plate. That is, the rib portions can support the arc chamber at various positions.

Accordingly, even when an arc is generated or an impact is applied to the arc chamber due to movement of an electromagnetic contactor, the coupled state between the arc chamber and the arc box can be stably maintained.

In addition, the aforementioned effects can be achieved by the coupling protrusion and the rib portion formed on the arc box and the arc chamber coupling hole formed in the arc chamber.

Therefore, excessive structural changes of the arc box and the electromagnetic contactor may not be required to achieve the aforementioned effects.

Also, the arc chamber may be located adjacent to a fixed contact and a movable contact. Accordingly, an arc generated due to a separation of the fixed contact and the movable contact can extend along the movable contact and quickly move to the arc chamber.

This can improve arc extinguishing capability.

DETAILED DESCRIPTION

Figure 1:
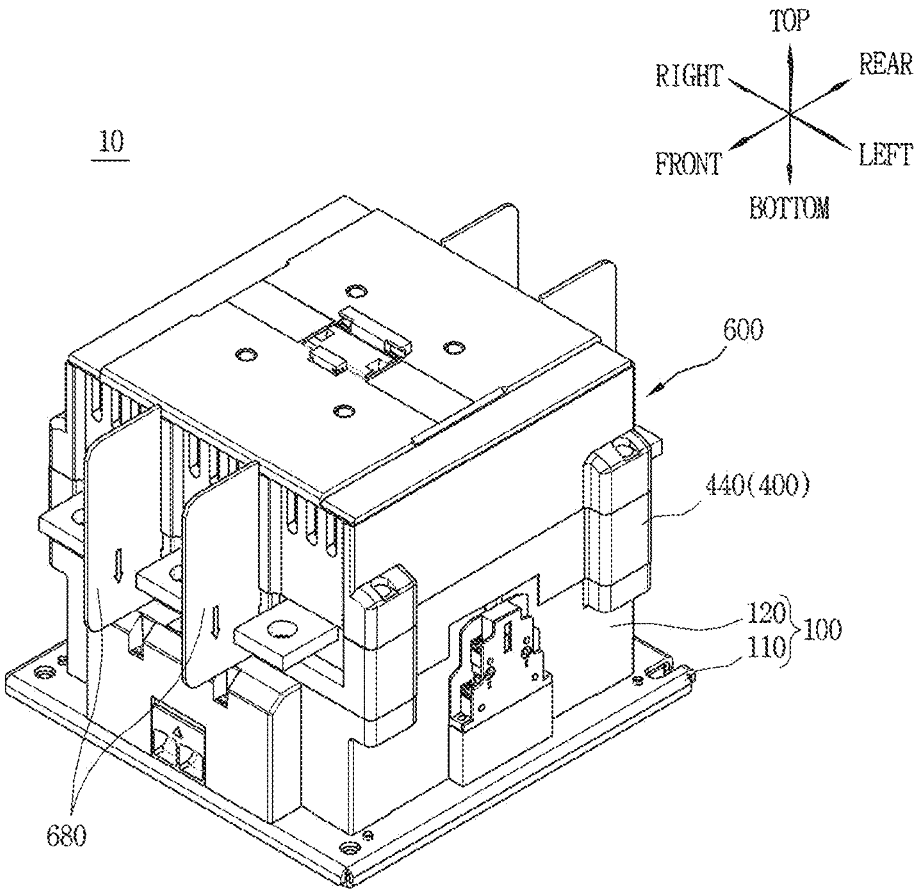
FIG. 1 is a perspective view illustrating an electromagnetic contactor in accordance with one implementation.

Hereinafter, an arc box 600 and an electromagnetic contactor 10 according to implementations of the present disclosure will be described in detail with reference to the accompanying drawings.

In the following description, descriptions of some components will be omitted to help understanding of the present disclosure.

1. Definition of Terms

It will be understood that when an element is referred to as being "connected with" another element, the element can be connected with the another element or intervening elements may also be present.

In contrast, when an element is referred to as being "directly connected with" another element, there are no intervening elements present.

A singular representation used herein may include a plural representation unless it represents a definitely different meaning from the context.

The term "magnetize" used in the following description refers to a phenomenon in which an object exhibits magnetism in a magnetic field.

The term "electric connection" used in the following description means a state in which two or more members are electrically connected. In an implementation, electrical connection may be used to indicate a state in which a current flows between at least two members or an electrical signal is transmitted between such at least two members.

The terms "left", "right", "top", "bottom", "front" and "rear" used in the following description will be understood based on a coordinate system illustrated in FIG. 1.

2. Description of configuration of electromagnetic contactor 10 according to implementation Referring to FIGS. 1 to 3, an electromagnetic contactor 10 according to an implementation may include a frame 100, a driving part 200, a movable contact part 300, and a fixed contact part 400.

Further referring to FIGS. 4 to 10, the magnetic contactor 500 according to the implementation may include an arc chamber 500 and an arc box 600. The arc chamber 500 may extinguish an arc which is generated when the movable contact part 300 and the fixed contact part 400 are separated from each other.

The arc chamber 500 according to the implementation may be firmly coupled to the arc box 600. In addition, the coupling can be easily made without a separate fastening member.

Hereinafter, each component of the electromagnetic contactor 10 according to the implementation will be described with reference to the accompanying drawings, and the arc chamber 500 and the arc box 600 will be described as separate clauses.

(1) Description of Frame 100

Figure 2:
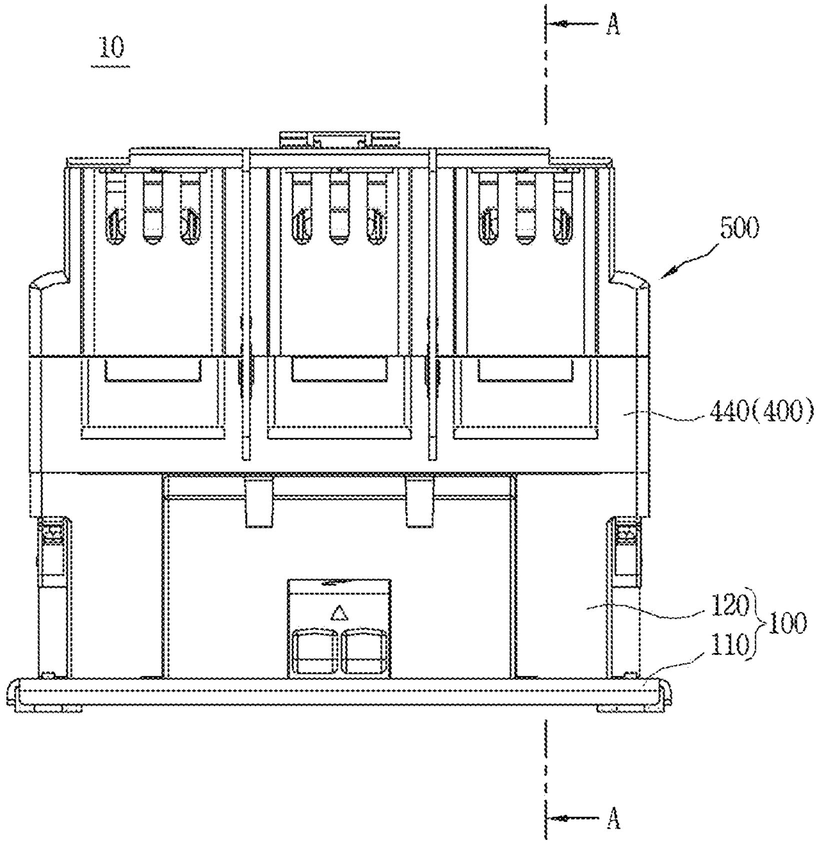
FIG. 2 is a front view illustrating the electromagnetic contactor of FIG. 1.
Figure 3:
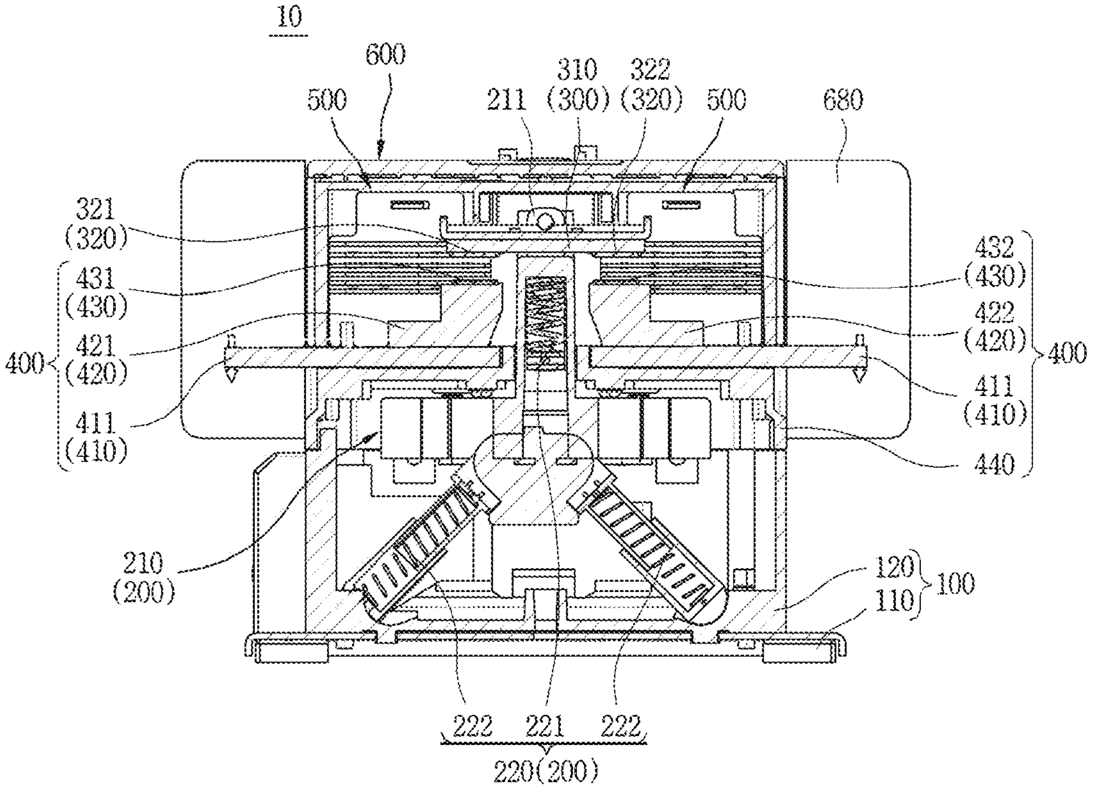
FIG. 3 is a cross-sectional view illustrating the electromagnetic contactor of FIG. 2, taken along the line A-A'.

Referring to FIGS. 1 to 3, the electromagnetic contactor 10 according to the implementation may include the frame 100.

The frame 100 may define appearance of the electromagnetic contactor 10. The frame 100 may have an inner space. Various components for operating the electromagnetic contactor 10 may be accommodated in the space. In one implementation, the driving part 200 may be accommodated in the space. Therefore, the frame 100 may be referred to as a "housing".

The space may be surrounded by an outer surface of the frame 100. That is, the space may be physically spaced apart from outside. Accordingly, each component accommodated in the space may not be arbitrarily exposed to the outside.

The space may be electrically connected to the outside. Specifically, the space may be electrically connected to an external power source or load. Accordingly, a current may be applied to a coil (not illustrated) accommodated in the space.

In the illustrated implementation, the frame 100 may have a rectangular cross-section and extend in a vertical (up and down) direction. The frame 100 may be formed in any shape capable of accommodating various components therein.

The frame 100 may be disposed beneath a support frame 440. The frame 100 may be coupled to the support frame 440. For the coupling, a fastening member (not illustrated) such as a screw member may be provided.

The frame 100 may be disposed below the arc box 600. The frame 100 may be coupled to the arc box 600 by the support frame 440. For the coupling, a fastening member (not illustrated) such as a screw member may be provided.

The frame 100 may include a base portion 110 and a lower frame portion 120.

The base portion 110 may define the bottom of the frame 100. The base portion 110 may be a portion in which the frame 100 comes in contact with an external environment. In one implementation, the base portion 110 may be fixed to the floor of an environment in which the electromagnetic contactor 10 is provided.

In the illustrated implementation, the base portion 110 may be formed in the shape of a rectangular plate. The base portion 110 may be formed in any shape capable of supporting the lower frame portion 120.

The lower frame portion 120 may be located on an upper side of the base portion 110.

The lower frame portion 120 may accommodate some components of the electromagnetic contactor 10 in a space defined therein. In one implementation, the driving part 200 and the like may be accommodated in the lower frame portion 120.

The lower frame portion 120 may be located on the upper side of the base portion 110. The lower frame portion 120 may be supported by the base portion 110. In one implementation, the lower frame portion 120 may be fixed onto the base portion 110.

The lower frame portion 120 may be disposed beneath the support frame 440. The lower frame portion 120 may support the support frame 440. The inner space of the lower frame portion 120 may communicate with the inner space of the support frame 440.

The lower frame portion 120 may be coupled to the support frame 440 by a fastening member (not illustrated) such as a screw member. The lower frame portion 120 may have the same cross-sectional shape as that of the support frame 440.

Accordingly, when the lower frame portion 120 is coupled to the base portion 110 and the support frame 440, the inner space of the lower frame portion 120 may not be arbitrarily exposed to the outside. This can prevent an arbitrary exposure of the components accommodated in the inner space of the lowerframe portion 120.

Although not illustrated, a coil (not illustrated) and a fixed core (not illustrated) may be disposed inside the lower frame portion 120. When a current is applied to the coil (not illustrated), the fixed core (not illustrated) may be magnetized by a magnetic field formed by the coil (not illustrated). Accordingly, the movable core 212 and a movable contact 320 connected to the movable core 212 may be brought into contact with a fixed contact 430, such that the electromagnetic contactor 10 can be electrically connected.

(2) Description of Driving Part 200

Referring back to FIG. 2, the electromagnetic contactor 10 according to the implementation may include the driving part 200.

The driving part 200 may generate a driving force for moving the movable contact part 300 toward or away from the fixed contact part 400.

In the illustrated implementation, the driving part 200 may be partially accommodated in the inner space of the lower frame portion 120. The remaining portion of the driving part 200 may be accommodated in a space portion 617 of the arc box 600.

The driving part 200 may be movably accommodated in the inner spaces of the lower frame portion 120 and the support frame 440. Specifically, the driving part 200 may be accommodated in the lower frame portion 120 and the support frame 440 to be movable up and down. In the implementation, the driving part 200 may be movable in the vertical direction.

The driving part 200 may include a crossbar 210 and an elastic member 220.

The crossbar 210 may be accommodated in the inner spaces of the lower frame portion 120 and the support frame 440 to be movable in the vertical direction.

The movable contact part 300 may be connected to the crossbar 210. The movable contact part 300 may be movable up and down together with the crossbar 210.

In response to the movement of the crossbar 210, the movable contact part 300 can be moved toward the fixed contact part 400 or away from the fixed contact part 400.

Although not illustrated, the coil (not illustrated) and the fixed core (not illustrated) may be disposed under the crossbar 210. When a current is applied to the coil (not illustrated), a magnetic field may be formed to magnetize the fixed core (not illustrated).

A magnetic force generated by magnetization of the fixed core (not illustrated) may attract the movable core 212. Accordingly, the movable contact part 300 can move toward the fixed contact part 400.

In the implementation, the crossbar 210 may include a plate portion extending in front and rear and left and right directions, and a pillar portion extending vertically from the plate portion.

The crossbar 210 may be formed in any shape that can be moved in the vertical direction together with the movable contact part 300.

The plate portion and the pillar portion of the crossbar 210 may be provided in plurality, respectively. The plurality of plate portions and pillar portions may be accommodated in a space portion 617.

In the illustrated implementation, a total of three space portions 617 may be provided, including first to third space portions 617*a*, 617*b*, and 617*c*. Accordingly, the plate portions and the pillar portions of the crossbar 210 may also be three, respectively, in number.

The plate portion and the pillar portion of the crossbar 210 may change depending on the number of the movable contact part 300, the fixed contact part 400, and the space portion 617.

The crossbar 210 may include a contact holder connection portion 211, a movable core 212, and a fixing portion 213.

The movable contact holder 311 of the movable contact part 300 may be connected to the contact holder connection portion 211. In one implementation, the movable contact holder 310 may be rotatably connected to the contact holder connection portion 211 in the extending direction thereof.

The contact holder connection portion 211 may be located at an upper side of the crossbar 210. Specifically, the contact holder connection portion 211 may be located adjacent to an upper end of the pillar portion of the crossbar 210.

The fixed contact part 400 and the arc chamber 500 may be located between the contact holder connection portion 211 and the plate portion.

The movable contact part 300 connected to the contact holder connection portion 211 may be movable toward the fixed contact part 400 or away from the fixed contact part 400. In addition, an arc generated by the separation of the movable contact 320 from the fixed contact 430 may be introduced into the arc chamber 500 to be extinguished.

The movable core 212 may move toward or away from the fixed core (not illustrated). Accordingly, the crossbar 210 and the movable contact part 300 connected thereto can be moved.

The movable core 212 may be implemented as any member or component capable of being attracted by a magnetic field. In one implementation, the movable core 212 may be formed of a conductive material. In another implementation, the movable core 212 may be implemented as an electromagnet or a permanent magnet.

The movable core 212 may be disposed beneath the plate portion of the crossbar 210. Accordingly, a distance between the movable core 212 and the fixed core (not illustrated) can be reduced, so that a magnetic force generated by the fixed core (not illustrated) can be effectively transmitted to the movable core 212.

The fixing portion 213 may be located above the crossbar 210. Specifically, the fixing portion 211 may be located more adjacent to an upper end of the pillar portion of the crossbar 210 than the contact holder connection portion 211. In one implementation, the fixing portion 213 may be located at an upper end of the pillar portion of the crossbar 210.

The fixing portion 213 may be coupled to the arc box 600. Specifically, the fixing portion 213 may be coupled through a crossbar support portion 640 that is formed through a top surface 615 of the arc box 600. The fixing portion 213 coupled to the arc box 600 may be exposed to the outside of the electromagnetic contactor 10.

Accordingly, the crossbar 210 can be stably coupled to the arc box 600. In addition, the crossbar 210 may be moved in the vertical direction with the fixing portion 213 as an axis.

The elastic member 220 may apply a restoring force for moving the crossbar 210 in a direction away from the fixed core (not illustrated), that is, upward in the illustrated implementation. The elastic member 220 may be located below the crossbar 210.

Specifically, the crossbar 210 may be moved in a direction toward the fixed core (not illustrated), that is, downward by the magnetic force generated by the fixed core (not illustrated). At this time, the crossbar 210 may be moved downward while pressing the elastic member 220.

Accordingly, in a state in which the movable contact 320 and the fixed contact 430 are in contact with each other in response to the movement of the crossbar 210, the elastic member 220 may store a restoring force by shape deformation.

When a current applied to the coil (not illustrated) is cut off due to an introduction of an overcurrent, the magnetized state of the fixed core (not illustrated) may be released. Accordingly, a magnetic attraction force applied to the movable core 212 may be released.

At this time, the elastic member 220 may apply the restoring force to the crossbar 210 in a direction away from the fixed core (not illustrated), that is, upward in the illustrated implementation.

Accordingly, the crossbar 210 can be moved away from the fixed core (not illustrated), and the contact state between the movable contact 320 and the fixed contact 430 can be released.

The elastic member 220 may be arbitrarily configured to be capable of storing restoring force by deformation and applying the stored restoring force to another member. In one implementation, the elastic member 220 may be configured as a coil spring.

The elastic member 220 220 may include a first elastic member 221 and a second elastic member 222.

The first elastic member 221 may be disposed in the crossbar 210. Specifically, the first elastic member 221 may be accommodated inside the pillar portion of the crossbar 210.

The second elastic member 222 may be located in the inner space of the lower frame portion 120. The second elastic member 222 may be located below the crossbar 210. The second elastic member 222 may elastically support the plate portion of the crossbar 210.

The second elastic member 222 may be provided in plurality. In the illustrated implementation, the second elastic member 222 may be disposed on each of front and rear sides. The second elastic member 222 may also be disposed on each of left and right sides of the lower frame portion 120. Thus, a total of four second elastic members 222 may be provided. The number of the second elastic member 222 may change.

When the crossbar 210 is moved downward, the first elastic member 221 and the second elastic member 222 may be respectively pressed so as to store a restoring force.

In this case, the magnitude of the restoring force stored by the first elastic member 221 and the second elastic member 222 may be smaller than the magnitude of a magnetic attraction force exerted by the fixed core (not illustrated) on the movable core 212.

Accordingly, in a state in which the fixed core (not illustrated) is magnetized, that is, in a state in which a current is applied to the coil (not illustrated), the elastic member 220 may be maintained in a state of being compressed and storing the restoring force.

(3) Description of Movable Contact Part 300

Referring to FIG. 3, the electromagnetic contactor 10 may include the movable contact part 300.

The movable contact part 210 may be moved together with the crossbar 210 in a direction toward the fixed contact part 400 or away from the fixed contact part 400.

The movable contact part 300 may be accommodated in a space portion defined in the arc box 600. The movable contact part 300 may be movable up and down in the space portion 617.

The movable contact part 300 may be connected to the crossbar 210. Specifically, the movable contact part 300 may be rotatably connected to the contact holder connection portion 211 of the crossbar 210.

The movable contact part 300 may be located at one side of the fixed contact part 400, namely, an upper side in the illustrated implementation. The movable contact part 300 may be brought into contact with the fixed contact part 400 as the movable contact part 300 is moved downward together with the crossbar 210.

The movable contact part 300 may be electrically connected to the fixed contact part 400. When the movable contact 320 is brought into contact with the fixed contact 430, the electromagnetic contactor 10 can be electrically connected to an external power source or load.

The movable contact part 300 may be provided in plurality. In the illustrated implementation, three movable contact parts 300 may be provided. The movable contact parts 300 may be accommodated in a plurality of space portions 617*a*, 617*b*, and 617*c*, respectively.

This may result from that three-phase currents of R-phase, S-phase and T-phase or U-phase, V-phase and W-phase are applied to the electromagnetic contactor 10.

The number of the movable contact part 300 may change depending on the number of phases of currents applied to the electromagnetic contactor 10.

The movable contact part 300 may include a movable contact holder 310 and a movable contact 320.

The movable contact holder 310 may define a body of the movable contact part 300. The movable contact holder 310 may extend in one direction, namely, in front and rear directions in the illustrated implementation.

An extension length of the movable contact holder 310 may be determined to correspond to a distance by which first and second fixed contacts 413 and 432 are spaced apart from each other.

The movable contact holder 310 may be coupled to the crossbar 210. Specifically, the movable contact holder 310 may be coupled to the contact holder connection portion 211 of the crossbar 210. In one implementation, the movable contact holder 310 may be rotatably coupled to the contact holder connection portion 211.

The movable contact holder 310 may be formed of a conductive material. A current flowing through a fixed contact holder 410 may flow into the movable contact holder 310 via the movable contact 320.

In one implementation, the movable contact holder 310 may be formed of a material such as iron (Fe) or copper (Cu).

The movable contact 320 may be located adjacent to each of both end portions in a longitudinal direction in which the movable contact holder 310 extends. The movable contact holder 310 may be electrically connected to the movable contact 320.

The movable contact 320 may be brought into contact with or separated from the fixed contact 430, in response to the movement of the crossbar 210. When the movable contact 320 and the fixed contact 430 are in contact, the electromagnetic contactor 10 can be electrically connected to the external power source or load.

When the movable contact 320 is separated from the fixed contact 430 in the electrically-connected state, an arc may be generated by the applied current. The generated arc can be extinguished by the arc chamber 500 and discharged to the outside of the electromagnetic contactor 10.

The movable contact 320 may be coupled to the movable contact holder 310. The movable contact 320 may be movable together with the movable contact holder 310.

The movable contact 320 may be electrically connected to the movable contact holder 310. The current introduced into the movable contact 320 from the fixed contact 430 may pass through the movable contact holder 310.

The movable contact 320 may be provided in plurality. In the illustrated implementation, the movable contacts 320 may include a first movable contact 321 located at the front side and a second movable contact 322 located at the rear side.

The first movable contact 321 may be located at one side in the direction in which the movable contact holder 310 extends, namely, at the front side in the illustrated implementation. In one implementation, the first movable contact 321 may be located adjacent to a front end portion of the movable contact holder 310.

The second movable contact 322 may be located at another side in the direction in which the movable contact holder 310 extends, namely, at the rear side in the illustrated implementation. In one implementation, the second movable contact 322 may be located adjacent to a rear end portion of the movable contact holder 310.

The number and position of the movable contact 320 may be determined depending on the position and number of the fixed contact 430.

Hereinafter, a process of applying a current to the movable contact part 300 by the configuration will be described.

First, a current may be introduced into any one of the first movable contact 321 and the second movable contact 322 from the fixed contact 430. The introduced current may flow toward the fixed contact 430 via another one of the first movable contact 321 and the second movable contact 322.

Accordingly, the electromagnetic contactor 10 can be electrically connected to the external power source or load.

(4) Description of Fixed Contact Part 400

Figure 9:
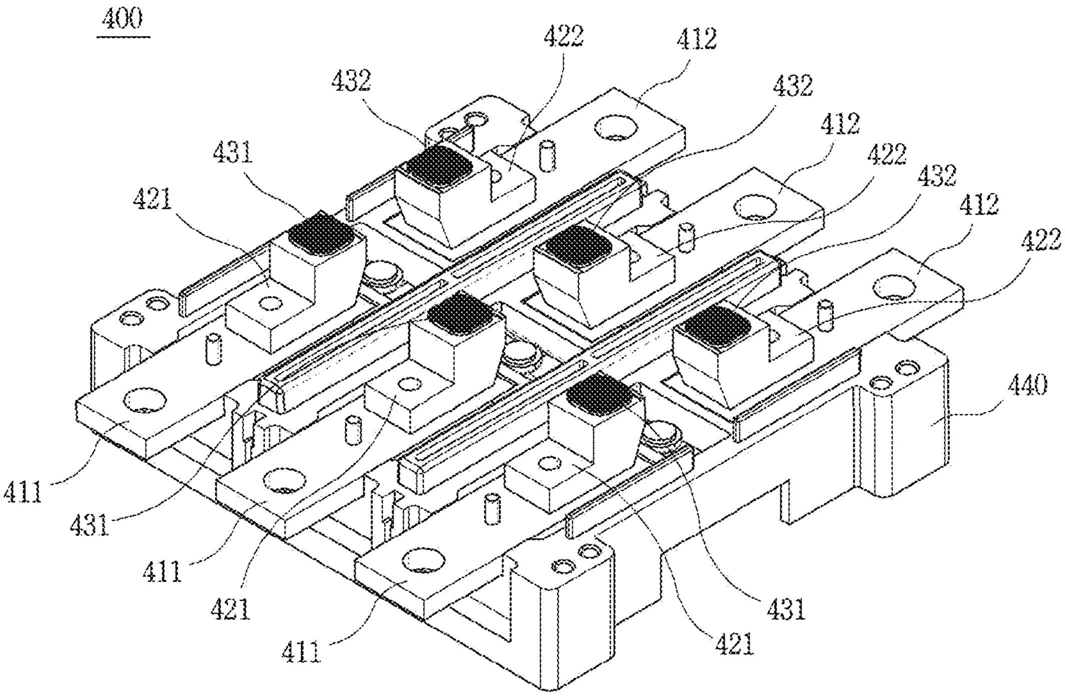
FIG. 9 is a perspective view illustrating a state in which the arc box is detached in the state of FIG. 7.

Referring to FIGS. 3 and 9, the electromagnetic contactor 10 according to the implementation may include the fixed contact part 400.

The fixed contact part 400 may be electrically brought into contact with or separated from the movable contact part 300, by the movement of the movable contact part 300. As the name implies, the fixed contact part 400 may not move.

The fixed contact part 400 may be accommodated in the inner space of the support frame 440 and the space portion 617 formed in the arc box 600. The fixed contact part 400 may be fixed to the inner space and the space portion 617.

The fixed contact part 400 may be fitted to the support member 440. Specifically, a fixed contact holder 410 of the fixed contact part 400 may be coupled through a contact holder through-hole, which is formed through both sides of the support frame 440, namely, through front and rear sides in the illustrated implementation.

The fixed contact part 400 may be located at one side of the movable contact part 300, namely, at a lower side in the illustrated implementation. The movable contact part 300 may be brought into contact with the fixed contact part 300 as the movable contact part 300 is moved downward together with the crossbar 210.

The fixed contact part 400 may be electrically connected to the movable contact part 300. When the movable contact 320 is brought into contact with the fixed contact 430, the electromagnetic contactor 10 can be electrically connected to an external power source or load.

The fixed contact part 400 may be provided in plurality. In the illustrated implementation, three fixed contact parts 400 may be provided. The plurality of fixed contact parts 400 may be brought into contact with or separated from the plurality of movable contact parts 300, respectively.

This may result from that three-phase currents of R-phase, S-phase and T-phase or U-phase, V-phase and W-phase are applied to the electromagnetic contactor 10.

The number of the fixed contact part 400 may change depending on the number of phases of currents applied to the electromagnetic contactor 10.

The fixed contact part 400 may include a fixed contact holder 410, a fixed contact block 420, a fixed contact 430, and a support frame 440.

Among those configurations, the support frame 440 may serve to fix the fixed contact part 400 to the electromagnetic contactor 10. Accordingly, it may be understood that the support frame 440 is included in the frame 100. However, in the following description, it will be described that the support frame 440 is included in the fixed contact part 400 for convenience of description.

The fixed contact holder 410 may define the body of the fixed contact part 400. Specifically, the fixed contact holder 410 may extend in one direction, namely, in the front and rear directions in the illustrated implementation.

The fixed contact holder 410 may preferably have an extension length which is long enough for its one side to be electrically in contact with the fixed contact block 420 and another side to protrude to the outside of the electromagnetic contactor 10.

The fixed contact holder 410 may be electrically connected to an external power source or load. As will be described later, the fixed contact holder 410 may be provided in plurality. The power source may be electrically connected to any one of the plurality of fixed contact holders 410 and the load may be electrically connected to another one.

The fixed contact holder 410 may be coupled to the support member 440. Specifically, the fixed contact holder 410 may be coupled through contact holder through-holes that are formed through two surfaces facing each other among those surfaces of the support frame 440.

In the illustrated implementation, the contact holder through-holes may be formed through the front and rear surfaces of the support frame 440. Accordingly, the fixed contact holder 410 can be coupled to the front and rear sides of the support frame 440.

The fixed contact holder 410 may be made of a conductive material. The external power source or load may be electrically connected to the fixed contact holder 410. A current introduced through the fixed contact holder 410 may flow out of the electromagnetic contactor 10 via the movable contact part 300.

In one implementation, the fixed contact holder 410 may be formed of a material such as iron (Fe) or copper (Cu).

The fixed contact holder 410 may be provided in plurality. A current may flow into any one of the plurality of fixed contact holders 410 and flow out from another one.

In the illustrated implementation, two fixed contact holders 410 may be provided, including a first fixed contact holder 220*a* and a second fixed contact holder 220*b*.

The first fixed contact holder 411 may be located on one side of the pillar portion of the crossbar 210, namely, on the front side in the illustrated implementation. In other words, the first fixed contact holder 411 may be located on one side with respect to the lower side of the first movable contact 321, namely, on the front side in the illustrated implementation.

One side of the first fixed contact holder 411 in the extending direction, namely, the front side in the illustrated implementation may protrude to the outside of the electromagnetic contactor 10 by a predetermined length. The power source or the load may be electrically connected to a portion of the first fixed contact holder 411 that protrudes to the outside.

Another side of the first fixed contact holder 411 in the extending direction, namely, the rear side in the illustrated implementation may extend to the lower side of the first movable contact 321. In other words, another end portion of the first fixed contact holder 411 in the extending direction may be located adjacent to the pillar portion of the crossbar 210.

A first fixed contact block 421 may be seated on the another side of the first fixed contact holder 411. The first fixed contact holder 411 may electrically come in contact with the first fixed contact block 421.

The second fixed contact holder 412 may be located on another side of the pillar portion of the crossbar 210, namely, on the rear side in the illustrated implementation. In other words, the second fixed contact holder 412 may be located on one side with respect to the lower side of the second movable contact 322, namely, on the rear side in the illustrated implementation.

One side of the second fixed contact holder 412 in the extending direction, namely, the rear side in the illustrated implementation may protrude to the outside of the electromagnetic contactor 10 by a predetermined length. The power source or the load may be electrically connected to a portion of the second fixed contact holder 412 that protrudes to the outside.

Another side of the second fixed contact holder 412 in the extending direction, namely, the front side in the illustrated implementation may extend to the lower side of the second movable contact 322. In other words, another end portion of the second fixed contact holder 412 in the extending direction may be located adjacent to the pillar portion of the crossbar 210.

A second fixed contact block 422 may be seated on the another side of the second fixed contact holder 412. The second fixed contact holder 412 may electrically come in contact with the second fixed contact block 422.

The fixed contact block 420 may be located between the fixed contact holder 410 and the fixed contact 430. The fixed contact block 420 may electrically connect the fixed contact holder 410 and the fixed contact 430.

In addition, the fixed contact block 420 may adjust a distance between the movable contact 320 and the fixed contact 430. That is, the distance between the movable contact 320 and the fixed contact 430 may be adjusted according to a height of the fixed contact block 420.

The fixed contact block 420 may be located adjacent to one end portion of the fixed contact holder 410. Specifically, the fixed contact block 420 may be located adjacent to one end portion of the fixed contact holder 410 that faces the pillar portion of the crossbar 210.

In other words, the fixed contact block 420 may be located adjacent to each one end portion of the plurality of fixed contact holders 410 facing each other.

The fixed contact block 420 may be located on an upper side of the fixed contact holder 410. The fixed contact block 420 may be seated on the fixed contact holder 410.

The fixed contact block 420 may extend to have a predetermined height. An extension length of the fixed contact block 420 may be determined depending on the distance between the movable contact 320 and the fixed contact 430. That is, the extension length of the fixed contact block 420 may be determined depending on a distance by which the crossbar 210 can move up and down.

As described above, the distance between the movable contact 320 and the fixed contact 430 can be adjusted by adjusting the height of the fixed contact block 420.

The fixed contact block 420 may electrically come in contact with the fixed contact holder 410. A current introduced into the fixed contact holder 410 may flow to the fixed contact block 420. Also, the current introduced into the fixed contact block 420 may flow to the fixed contact holder 410.

The fixed contact block 420 may electrically come in contact with the fixed contact 430. A current introduced into the fixed contact 430 may flow to the fixed contact block 420. Also, the current introduced into the fixed contact block 420 may flow to the fixed contact 430.

The fixed contact block 420 may be provided in plurality. The plurality of fixed contact blocks 420 may be electrically coupled to the plurality of fixed contact holders 410, respectively. In addition, the plurality of fixed contact blocks 420 may be electrically coupled to the plurality of fixed contacts 430, respectively.

In the illustrated implementation, two fixed contact blocks 420 may be provided, including the first fixed contact block 421 and the second fixed contact block 422.

The first fixed contact block 421 may electrically come in contact with the first fixed contact holder 411. Specifically, the first fixed contact block 421 may be located adjacent to one side of the first fixed contact holder 411, namely, to the rear end portion in the illustrated implementation.

The first fixed contact 431 may be seated on the first fixed contact block 421. The first fixed contact block 421 may electrically come in contact with the first fixed contact 431.

The second fixed contact block 422 may electrically come in contact with the second fixed contact holder 412. Specifically, the second fixed contact block 422 may be located adjacent to one side of the second fixed contact holder 412, namely, to the front end portion in the illustrated implementation.

The second fixed contact 432 may be seated on the second fixed contact block 422. The second fixed contact block 422 may electrically come in contact with the second fixed contact 432.

The fixed contact 430 may be brought into contact with or separated from the movable contact 320. When the fixed contact 430 is brought into contact with the movable contact 320, the fixed contact 400 and the movable contact 300 may be electrically connected to each other. Accordingly, the electromagnetic contactor 10 can be electrically connected to the external power source or load.

The fixed contact 430 may be located on an upper side of the fixed contact block 420. The fixed contact 430 may be seated on one side of the fixed contact block 420, namely, on an upper surface in the illustrated implementation.

The fixed contact 430 may be located below the movable contact part 300. Specifically, the fixed contact 430 may be located below the movable contact 320. In one implementation, the fixed contact 430 may be located right below the movable contact 320.

The fixed contact 430 may electrically come in contact with the fixed contact block 420. A current introduced into the fixed contact 430 may flow to the fixed contact block 420. Also, the current introduced into the fixed contact block 420 may flow to the fixed contact 430.

The fixed contact 430 may be provided in plurality. The plurality of fixed contacts 430 may be respectively located on the plurality of fixed contact blocks 420 to be electrically connected to the fixed contact blocks 420.

In the illustrated implementation, two fixed contacts 430 may be provided, including a first fixed contact 431 and a second fixed contact 432.

The first fixed contact 431 may be coupled to the first fixed contact block 421. The first fixed contact 431 may electrically come in contact with the first fixed contact block 421.

The second fixed contact 432 may be coupled to the second fixed contact block 422. The second fixed contact 432 may electrically come in contact with the second fixed contact block 422.

The support frame 440 may define a portion of the frame 500. The support frame 440 may have an inner space. The fixed contact holder 410, the fixed contact block 420 and the fixed contact 430 may be accommodated in the inner space.

The fixed contact holder 410 may be coupled to the support frame 440. Specifically, contact holder through-holes may be formed through both side surfaces of the support frame 440 that face each other in one direction, namely, through front and rear surfaces in the illustrated implementation. The fixed contact holder 410 may be coupled through the contact holder through-holes.

In addition, the support frame 440 may support the fixed contact holder 410 from the lower side. In one implementation, the support frame 440 may be fixed onto the fixed contact holder 410. For the fixing, a fastening member (not illustrated) such as a screw member may be provided.

Accordingly, the fixed contact holder 410 may not arbitrarily swing.

The upper frame 440 may be located on an upper side of the lower frame portion 120. The support frame 440 may be fixedly coupled to the lower frame portion 120.

The inner space of the support frame 440 and the inner space of the lower frame portion 120 may communicate with each other. Accordingly, a space in which the crossbar 210 is movable up and down can be secured.

The support frame 440 may be disposed on the lower side of the arc box 600. The support frame 440 may be fixedly coupled to the arc box 600.

The inner space of the support frame 440 and the space portion 617 of the arc box 600 may communicate with each other. Accordingly, a space in which the crossbar 210 and the movable contact part 300 are movable up and down can be secured.

3. Description of arc chamber 500 according to implementation

Referring to FIGS. 6 to 12, the electromagnetic contactor 10 according to the implementation may include the arc chamber 500.

The arc chamber 500 may extinguish an arc generated when the movable contact 320 and the fixed contact 430 are separated from each other. The arc may be extinguished while passing through the arc chamber 500, and then discharged to the outside of the electromagnetic contactor 10.

The arc chamber 500 according to the implementation may be firmly coupled to the arc box 600. Also, the arc chamber 500 according to the implementation may be easily coupled to the arc box 600.

The arc chamber 500 may be located on an upper side of the fixed contact part 400. Also, the arc chamber 500 may be located on a lower side of the movable contact part 300. As the movable contact part 300 moves toward the fixed contact part 400, the height of the movable contact part 300 may become lower than the height of the arc chamber 500.

The arc chamber 500 may be located adjacent to the fixed contact block 420 and the fixed contact 430. Specifically, the arc chamber 500 may be located adjacent to one end portion of each of the plurality of fixed contact holders 410 facing each other.

As described above, the fixed contact 430 may be located right below the movable contact 320. Accordingly, it may be said that the arc chamber 500 is located adjacent to the movable contact 320.

The arc chamber 500 may be provided in plurality. The plurality of arc chambers 500 may be located adjacent to the fixed contacts 430, respectively.

In the illustrated implementation, two arc chambers 500 may be provided, and may be located adjacent to the first fixed contact 431 and the second fixed contact 432, respectively.

As described above, a total of three pairs of fixed contacts 430 may be disposed according to the implementation, and thus a total of six arc chambers 500 may be provided. The number of the arc chamber 500 may change depending on the number of the fixed contact 430.

The arc chamber 500 may be accommodated in the space portion 617 of the arc box 600. Also, the arc chamber 500 may be coupled to the arc box 600. A detailed description thereof will be given later.

Figure 10:
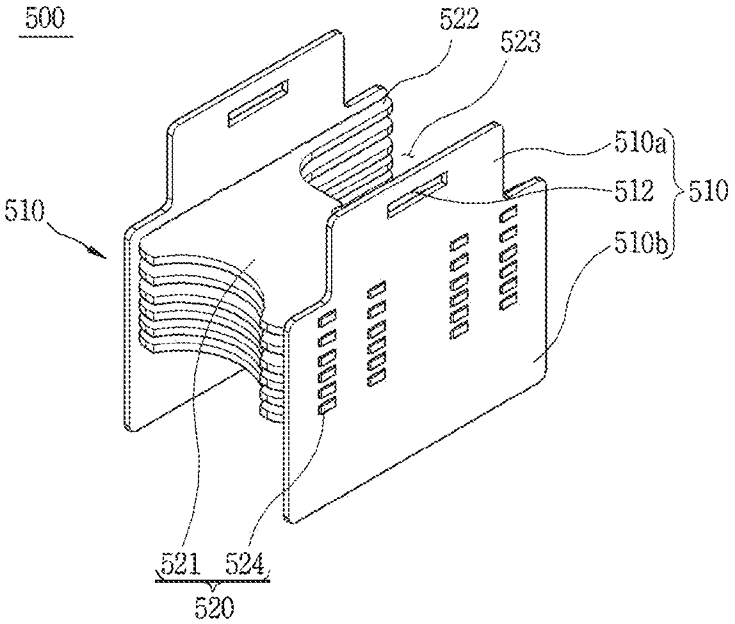
FIG. 10 is a perspective view illustrating an arc chamber disposed in the electromagnetic contactor of FIG. 1.
Figure 11:
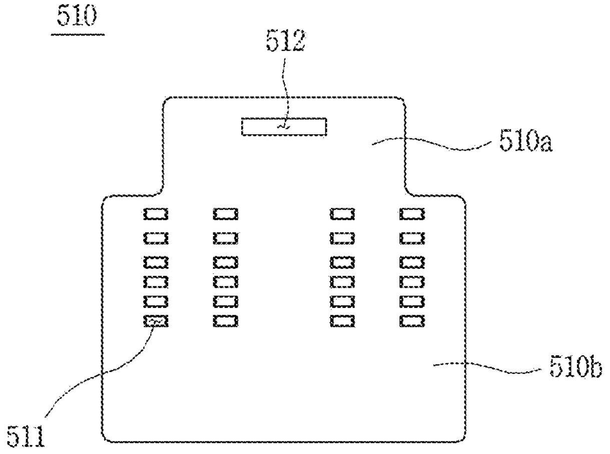
FIG. 11 is a lateral view illustrating a side wall disposed in the arc chamber of FIG. 10.
Figure 12:
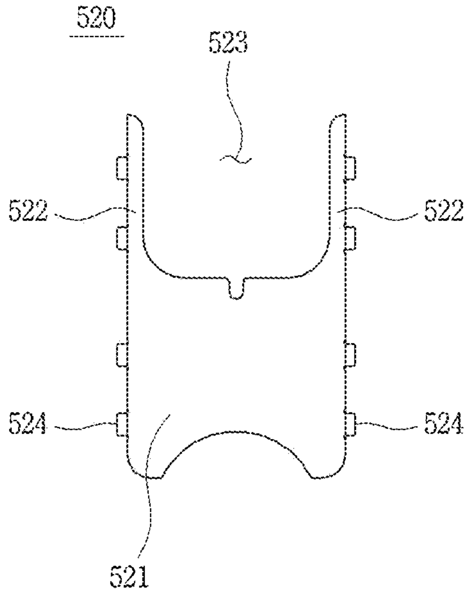
FIG. 12 is a planar view illustrating the arc chamber of FIG. 10.

Referring to FIGS. 10 to 12, the arc chamber 500 may include a support plate 510 and a grid 520.

That support plate 510 may define each of both sides of the arc chamber 500. The grid 520 may be coupled to the support plate 510. Accordingly, the support plate 510 may also be referred to as a "grid supporting portion".

The support plate 510 may be provided in plurality. In the illustrated implementation, two support plates 510 may be disposed to face each other. each of the support plates 510 may define left and right surfaces of the arc chamber 500.

The support plate 510 may be formed in a shape of a plate having a predetermined thickness. The support plate 510 may be divided into a first portion 510*a* and a second portion 510*b*.

The first portion 510*a* may define one side of the support plate 510 in a direction away from the fixed contact 430, namely, the upper side in the illustrated implementation. The first portion 510*a* may be formed in a rectangular shape.

The first portion 510*a* may be continuous with the second portion 510*b*. The first portion 510*a* may have a narrower width than the second portion 510*b*.

In the illustrated implementation, the first portion 510*a* may be shorter than the second portion 510*b* in the front and rear directions.

When the arc chamber 500 is coupled to the arc box 600, the first portion 510*a* may be supported by a first rib portion 671. Therefore, the contact state between the arc chamber 500 and the arc box 600 can be stably maintained.

Arc box coupling holes 512 may be formed through the first portion 510*a*. A detailed description thereof will be given later.

The second portion 510*b* may define another side of the support plate 510 in a direction toward the fixed contact 430, namely, the lower side in the illustrated implementation. The second portion 510*b* may be formed in a rectangular shape.

The second portion 510*b* may be continuous with the first portion 510*a*. The second portion 510*b* may have a wider width than the second portion 510*a*. In the illustrated implementation, the second portion 510*b* may be longer than the first portion 510*a* in the front and rear directions.

When the arc chamber 500 is coupled to the arc box 600, the second portion 510*b* may be supported by a second rib portion 672. Therefore, the contact state between the arc chamber 500 and the arc box 600 can be stably maintained.

A grid coupling hole 511 may be formed through the second portion 510*b*. A detailed description thereof will be given later.

The support plate 510 may include a grid coupling hole 511 and an arc box coupling hole 512.

The grid coupling hole 511 may be a portion where the grid 520 is coupled to the support plate 510. An insertion protrusion 524 of the grid 520 may be coupled through the grid coupling hole 511. In one implementation, the insertion protrusion 524 may be fitted into the grid coupling hole 511. Accordingly, the support plate 510 can be firmly coupled to the grid 520.

The grid coupling hole 511 may be provided in plurality. The plurality of grid coupling holes 511 may be disposed to be spaced apart from one another by predetermined distances. The insertion protrusions 524 may be coupled through the plurality of grid coupling holes 511, respectively.

In the illustrated implementation, five grid coupling holes 511 may be disposed in the vertical direction and four in the front and rear directions.

The number of the grid coupling hole 511 in the vertical direction may result from that five grids 520 are disposed in the arc chamber 500. In addition, the number of the grid coupling hole 511 in the front and rear directions may result from that four insertion protrusions 524 protrude from outside of each wing portion 522 of the grid 520.

The position and number of the grid coupling hole 511 may change depending on the number of the grid 520 and the insertion protrusion 524.

The arc box coupling hole 512 may be a portion where the arc chamber 500 is coupled to the arc box 600. A coupling protrusion 660 of the arc box 600 may be coupled through the arc box coupling hole 512. In one implementation, the coupling protrusion 660 may be fitted or snap-fitted to the arc box coupling hole 512.

Accordingly, the arc chamber 500 and the arc box 600 can be firmly and easily coupled to each other.

The arc box coupling hole 512 may be formed through the first portion 510*a*. The arc box coupling hole 512 may be located at a central region of the first portion 510*a* in a widthwise direction. The arc box coupling hole 512 may extend in one direction, namely, in the front and rear directions in the illustrated implementation.

The position and shape of the arc box coupling hole 512 may change depending on the position and shape of the coupling protrusion 660.

The grid 520 may extinguish an arc generated when the movable contact 320 and the fixed contact 430 are separated from each other. The arc generated between the movable contact 320 and the fixed contact 430 may extend along the movable contact 320. At this time, the grid 520 may extinguish the arc by sucking the extended arc.

The grid 520 may be formed of a magnetic material. Accordingly, the grid 520 can apply an attractive force to the arc that is the flow of electrons. In one implementation, the grid 520 may be implemented as a permanent magnet or the like.

The grid 520 may be formed in the shape of a plate. In the illustrated implementation, the grid 520 may be formed in the shape like "U" in which a contact accommodating portion 523 is open.

The grid 520 may be provided in plurality. The plurality of grids 520 may be stacked with a predetermined distance therebetween in a direction away from the fixed contact 430. In the illustrated implementation, five grids 520 may be provided.

The grid 520 may be coupled to the support plate 510. Specifically, the insertion protrusions 524 protruding from both sides of each grid 520, namely, from left and right end portions in the illustrated implementation, may be coupled through the grid coupling holes 511 of the support plate 510.

The grid 520 may include a plate portion 521, a wing portion 522, a contact accommodating portion 523, and an insertion protrusion 524.

The plate portion 521 may define a body of the grid 520. The plate portion 521 may be continuous with the wing portion 522. The plate portion 521 may be located in a direction away from the fixed contact 430.

The wing portion 522 may be located on each of both sides of the plate portion 521, namely, on each of left and right sides in the illustrated implementation.

The wing portion 522 may extend by a predetermined length from the plate portion 521. Specifically, the wing portion 522 may extend toward the fixed contact 430 from each of both sides of the plate portion 521, namely, from each of the left and right sides in the illustrated implementation.

The wing portion 522 may be provided in plurality. The plurality of wing portions 522 may be spaced apart from each other by a predetermined distance. In the illustrated implementation, a total of two wing portions 522 may be disposed on the left and right sides.

A predetermined space may be defined between the plurality of wing portions 522. The space may be defined as the contact accommodating portion 523.

The contact accommodating portion 523 may be a space in which the movable contact 320 moves up and down. That is, the movable contact 320 may be moved in a direction toward or away from the fixed contact 430 in an accommodated state in the contact accommodating portion 523. The contact accommodating portion 523 may be located adjacent to the fixed contact 430.

The contact accommodating portion 523 may be defined as a space surrounded by one side of the plate portion 521 facing the fixed contact 430 and sides of the plurality of wing portions 522 facing each other. One side of the contact accommodating portion 523 in a direction away from the plate portion 521 may be open.

The insertion protrusion 524 may be a portion at which the grid 520 is coupled to the support plate 510. The insertion protrusion 524 may be coupled through the grid coupling hole 511 of the support plate 510.

The insertion protrusion 524 may protrude from an outer surface of each wing portion 522. In the illustrated implementation, the insertion protrusions 524 may protrude from a left surface of the wing portion 522 located at the left side and a right surface of the wing portion 522 located at the right side, respectively.

In addition, when it is seen that the wing portion 522 extends from one end of the plate portion 521 surrounding the contact accommodating portion 523, it may also be understood that the insertion protrusion 524 protrudes from the plate portion 521 and an outer surface of the wing portion 522.

The insertion protrusion 524 may be provided in plurality. The plurality of insertion protrusions 524 may be disposed to be spaced apart from one another by predetermined distances. In the illustrated implementation, a total of four insertion protrusions 524 may be provided.

The position and number of the insertion protrusion 524 may change depending on the position and number of the grid coupling hole 511.

4. Description of Arc Box 600 According to Implementation

Figure 13:
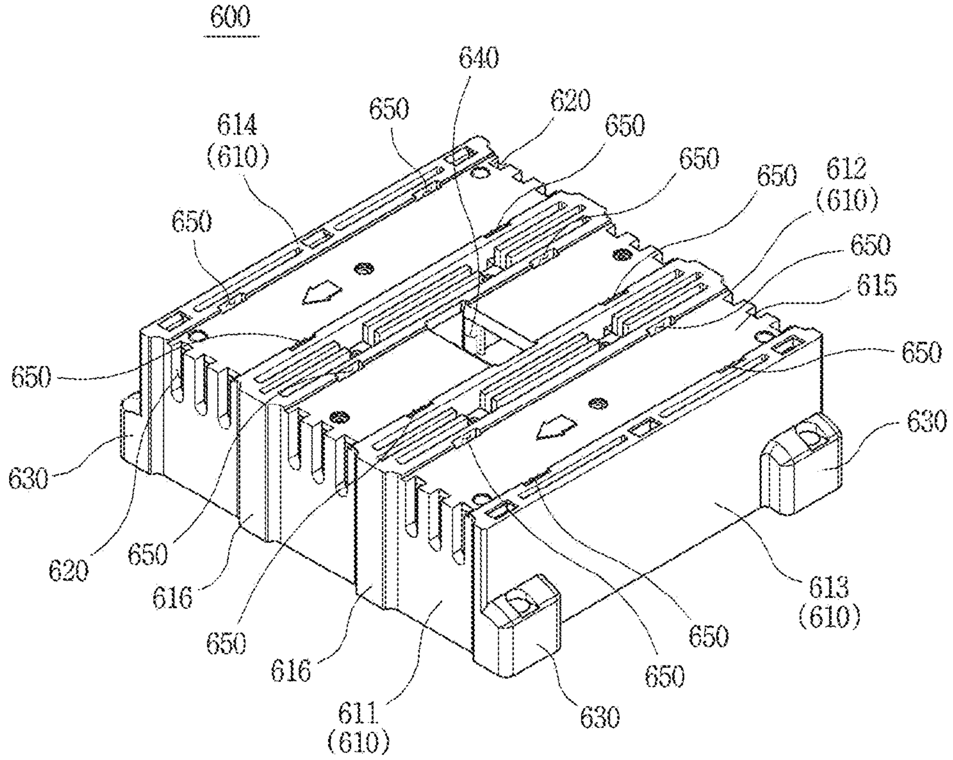
FIG. 13 is a perspective view illustrating the arc box disposed in the electromagnetic contactor of FIG. 1.
Figure 14:
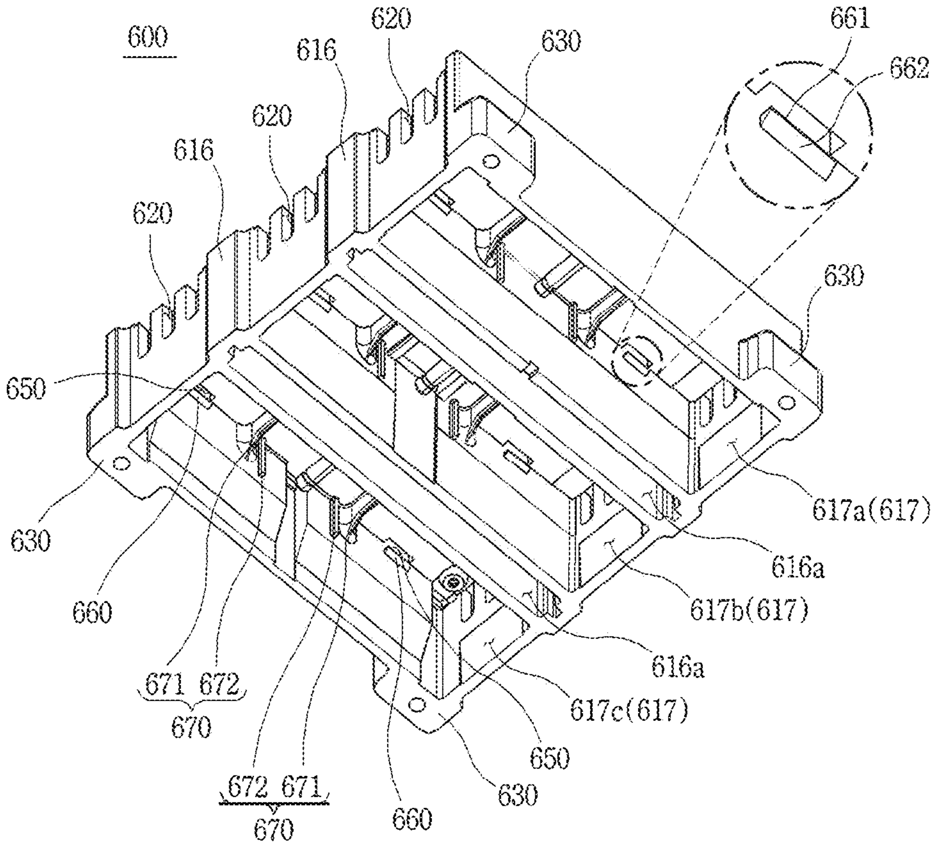
FIG. 14 is a front view illustrating the arc box of FIG. 13.
Figure 15:
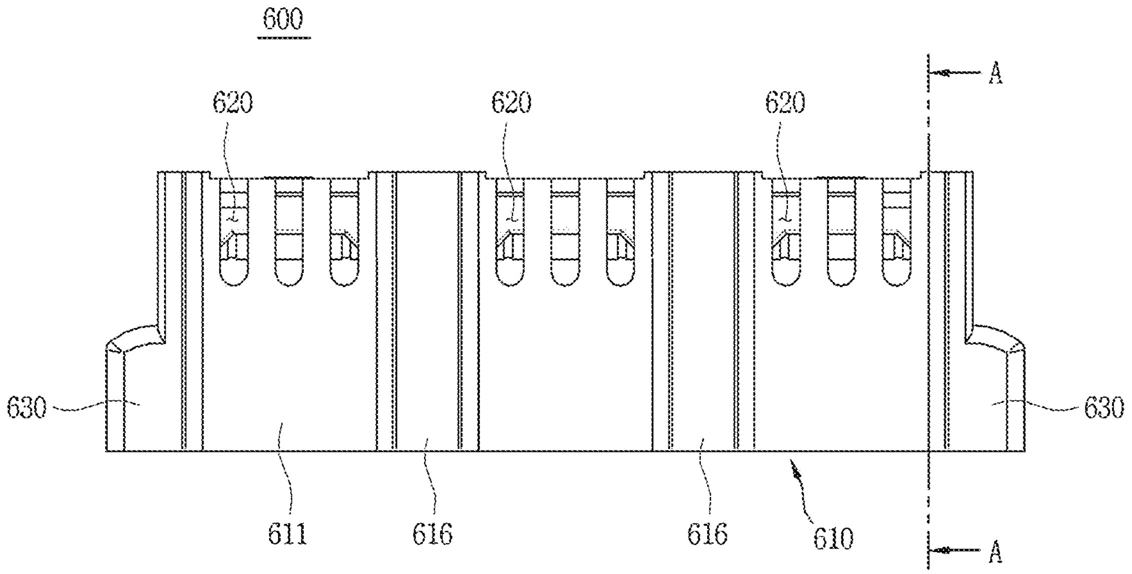
FIG. 15 is a perspective view illustrating the arc box of FIG. 13 at a different angle.

Referring to FIGS. 13 to 15, the electromagnetic contactor 10 according to the implementation may include the arc box 600.

The arc box 600 may define a part of appearance of the electromagnetic contactor 10. In the illustrated implementation, the arc box 600 may define an upper appearance of the electromagnetic contactor 10. Accordingly, the arc box 600 may also be understood as a part of the frame 100.

The arc box 600 may be disposed on an upper side of the support frame 440. The arc box 600 may be coupled to the support frame 440. For the coupling, a fastening member (not illustrated) such as a screw member may be provided.

A space portion 617 may be defined inside the arc box 600. The movable contact part 300, the fixed contact part 400, and the arc chamber 500 may be accommodated in the space portion 617.

The arc box 600 may communicate with the outside. An arc generated due to the separation between the movable contact 320 and the fixed contact 430 may be extinguished by the arc chamber 500 and then discharged to the outside of the arc box 600.

The arc box 600 may be coupled to the arc chamber 500. The arc chamber 500 may be firmly coupled to the arc box 600. In addition, the arc chamber 500 may be easily coupled to the arc box 600.

In the illustrated implementation, the arc box 600 may include a cover portion 610, an arc discharge hole 620, a frame coupling portion 630, a crossbar support portion 640, an opening 650, a coupling protrusion 660, a rib portion 670, and a blocking wall portion 680.

The cover portion 610 may define the appearance of the arc box 600. The cover portion 610 may surround the space portion 617 defined inside the arc box 600. Various components for extinguishing the arc may be accommodated in the cover portion 610.

The cover portion 610 may be disposed on the upper side of the support frame 440. An opening may be formed through one side of the cover portion 610 facing the support frame 440, namely, through the lower side in the illustrated implementation. Accordingly, the space portion 617 and the inner space of the support frame 440 can communicate with each other through the opening.

In the illustrated implementation, the cover portion 610 may have a rectangular cross-section and have a rectangular pillar shape extending by a predetermined height. The cover portion 610 may be formed in any shape that can be coupled to the support frame 440 and accommodate components for extinguishing the arc.

The cover portion 610 may include a first side wall 611, a second side wall 612, a third side wall 613, a fourth side wall 614, an upper surface 616, a partition 616, and a space portion 617.

The first side wall 611 may define one surface of the cover portion 610. In the illustrated implementation, the first side wall 610 may define a front surface of the cover portion 610.

The first side wall 611 may be divided into a plurality of regions by the partition 616. In the illustrated implementation, the first side wall 611 may be divided into three regions by two partitions 616.

The arc discharge hole 620 may be formed through the first side wall 611. The arc discharge hole 620 may be provided in plurality in each region of the first side wall 611. In the illustrated implementation, three arc discharge holes 620 may be formed for each region of the first side wall 611.

The first side wall 611 may be disposed to face the second side wall 612. The first side wall 611 may be continuous with the third side wall 613 and the fourth side wall 614. Further, the first side wall 611 may be continuous with the top surface 615.

The second side wall 612 may define another surface of the cover portion 610. In the illustrated implementation, the second side wall 610 may define a rear surface of the cover portion 610.

The second side wall 612 may be divided into a plurality of regions by the partition 616. In the illustrated implementation, the second side wall 612 may be divided into three regions by two partitions 616.

The arc discharge hole 620 may be formed through the second side wall 612. The arc discharge hole 620 may be provided in plurality in each region of the second side wall 612. In the illustrated implementation, three arc discharge holes 620 may be formed in each region of the second side wall 612.

In one implementation, the first side wall 611 and the second side wall 612 may be formed in a symmetrical structure.

The second side wall 612 may be disposed to face the first side wall 611. The second side wall 612 may be continuous with the third side wall 613 and the fourth side wall 614. Further, the second side wall 612 may be continuous with the top surface 615.

The third side wall 613 may define still another surface of the cover portion 610. In the illustrated implementation, the third side wall 610 may define a left surface of the cover portion 610.

The third side wall 613 may extend between one end portion of the first side wall 611 and one end portion of the second side wall 612. In the illustrated implementation, the third side wall 613 may extend between a left end portion of the first side wall 611 and a left end portion of the second side wall 612.

The frame coupling portion 630 may be located on an outer side of the third side wall 613. In addition, the opening 650 may be formed through one side of the third side wall 613, namely, through an upper side in the illustrated implementation.

The coupling protrusion 660 may protrude from an inner side of the third side wall 613. In addition, the rib portion 670 may be formed on the inner side of the third side wall 613.

The third side wall 613 may be disposed to face the fourth side wall 614. The third side wall 613 may be continuous with the first side wall 611 and the second side wall 612. Further, the third side wall 613 may be continuous with the top surface 615.

The fourth side wall 614 may define still another surface of the cover portion 610. In the illustrated implementation, the fourth side wall 610 may define a right surface of the cover portion 610.

The fourth side wall 614 may extend between another end portion of the first side wall 611 and another end portion of the second side wall 612. In the illustrated implementation, the fourth side wall 614 may extend between a right end portion of the first side wall 611 and a right end portion of the second side wall 612.

The frame coupling portion 630 may be located on an outer side of the fourth side wall 614. In addition, the opening 650 may be formed through one side of the fourth side wall 614, namely, through an upper side in the illustrated implementation.

The coupling protrusion 660 may protrude from an inner side of the fourth side wall 614. In addition, the rib portion 670 may be formed on the inner side of the fourth side wall 614.

In one implementation, the third side wall 613 and the fourth side wall 614 may be formed in a symmetrical structure.

The fourth side wall 614 may be disposed to face the third side wall 613. The fourth side wall 614 may be continuous with the first side wall 611 and the second side wall 612. Further, the fourth side wall 614 may be continuous with the top surface 615.

The top surface 615 may define one surface of the cover portion 610. In the illustrated implementation, the upper surface 610 may define a top surface of the cover portion 610. The top surface 615 may cover the space portion 617 defined inside the cover portion 610 from the upper side.

The top surface 615 may be divided into a plurality of regions by the partition 616. In the illustrated implementation, the top surface 615 may be divided into three regions by two partitions 616.

In the illustrated implementation, each region of the top surface 615 may be disposed in the left and right directions. In this case, a crossbar support portion 640 may be formed through one region of the top surface 615 located in the middle.

Arc discharge holes 620 may be formed through both sides of the top surface 615, namely, through the front and rear sides in the illustrated implementation.

The partition 616 may divide the space portion 617 defined inside the cover portion 610 into a plurality of spaces. The partition 616 may also divide the first side wall 611, the second side wall 612, and the top surface 615 into a plurality of regions.

The partition 616 may extend between the first side wall 611 and the second side wall 612. In the illustrated implementation, the partition 616 may extend in the front and rear directions.

In the illustrated implementation, a front end portion of the partition 616 may protrude from the first side wall 611 by a predetermined length. In addition, a rear end portion of the partition 616 may protrude from the second side wall 612 by a predetermined length.

Further, an upper end portion of the partition 616 may protrude from the top surface 615 by a predetermined length.

The partition 616 may be provided in plurality. The plurality of partitions 616 may be disposed to be spaced apart from each other by a predetermined distance. In the illustrated implementation, two partitions 616 may be provided.

The plurality of partitions 616 may be spaced apart from each other by the predetermined distance between the third side wall 613 and the fourth side wall 614. In the illustrated implementation, the partitions 616 may be spaced apart from each other by the predetermined distance between the third side wall 613 and the fourth side wall 614.

The partition 616 may at least partially surround the space portion 617.

In the illustrated implementation, the partition 616 located at the left may partially surround a first space portion 617*a* and a second space portion 617*b*. Further, the partition 616 located at the right may partially surround the second space portion 617*b* and a third space portion 617*c*.

The opening 650, the coupling protrusion 660, and the rib portion 670 may be disposed on a surface of the partition 616 facing each of the space portions 617*a*, 617*b*, and 617*c*.

The partition 616 may include a buffer portion 616*a*.

The buffer portion 616*a* may be a space defined inside the partition 616. The buffer portion 616*a* may be located between the plurality of space portions 617 partitioned by the partition 616.

When a high-temperature and high-pressure arc is generated in one or more of the space portions 617*a*, 617*b*, and 617*c*, the movable contact part 300 or the fixed contact part 400 accommodated in another one or more space portions 617*a*, 617*b*, and 617*c* may be damaged.

The buffer portion 616*a* may be located between the adjacent space portions 617*a*, 617*b*, and 617*c*, to buffer a shock and the like. This can minimize the affection of the high-temperature and high-pressure arc to other space portions 617*a*, 617*b*, and 617*c*.

The buffer portion 616*a* may extend in the same direction as the partition 616. That is, the buffer portion 616*a* may extend between the first side wall 611 and the second side wall 612. In the illustrated implementation, the buffer portion 616*a* may extend in the front and rear directions.

The buffer portion 515 may be provided in plurality. The plurality of buffer portions 616*a* may be formed in the respective partitions 616. In the illustrated implementation, the buffer portions 616*a* may be disposed in the two partitions 616, respectively.

The space portion 617 may be a space for accommodating the movable contact part 300, the fixed contact part 400, and the arc chamber 500. The space portion 617 may be defined as a space surrounded by the first to fourth side walls 611, 612, 613, and 614 and the top surface 615.

The space portion 617 may communicate with the inner space of the support frame 440. The movable contact part 210 accommodated in the space portion 617 may move together with the crossbar 210 in a direction toward or away from the fixed contact part 400.

The space portion 617 may communicate with the outside of the arc box 600. The communication may be achieved by the arc discharge hole 620. An arc generated in the space portion 617 may be extinguished through the arc chamber 500 and then discharged to the outside through the arc discharge hole 620.

The coupling protrusion 660 and the rib portion 670 may be located inside the space portion 617.

The space portion 617 may be divided into a plurality of spaces by the partition 616. In the illustrated implementation, the space portion 617 may be divided into the first space portion 617*a*, the second space portion 617*b*, and the third space portion 617*c* by the two partitions 616.

This may result from that currents of three phases are applied to the electromagnetic contactor 10 according to the implementation. That is, as currents of R-phase, S-phase and T-phase or U-phase, V-phase, and W-phase are applied, a component for arc extinguishing may be disposed in each space portion 617*a*, 617*b*, and 617*c* for each phase of current.

The number of the space portion 617 partitioned may change depending on the number of phases of currents applied to the electromagnetic contactor 10.

The space portion 617 may be surrounded by the first to fourth side walls 611, 612, 613, and 614, the top surface 615, and the partition 616. A detailed description thereof will be given later.

That is, the space portion 617 may include a first space portion 617*a*, a second space portion 617*b*, and a third space portion 617*c*.

The first space portion 617*a* may be a space surrounded by the first side wall 611, the second side wall 612, the third side wall 613, the top surface 615, and the partition 616. In the illustrated implementation, the first space portion 617*a* may be located at the leftmost among the plurality of space portions 617*a*, 617*b*, and 617*c*.

The crossbar 210, the movable contact part 300, the fixed contact part 400, and the arc chamber 500 may be accommodated in the first space portion 617*a*. In the illustrated implementation, two arc chambers 500 may be accommodated in the first space portion 617*a*.

The second space portion 617*b* may be a space surrounded by the first side wall 611, the second side wall 612, the top surface 615, and the partition 616. In the illustrated implementation, the second space portion 617*b* may be located in the middle among the plurality of space portions 617*a*, 617*b*, and 617*c*.

The crossbar 210, the movable contact part 300, the fixed contact part 400, and the arc chamber 500 may be accommodated in the second space portion 617*b*. In the illustrated implementation, the two arc chambers 500 may be accommodated in the second space portion 617*b*.

The third space portion 617*c* may be a space surrounded by the first side wall 611, the second side wall 612, the fourth side wall 614, the top surface 615, and the partition 616. In the illustrated implementation, the third space portion 617*c* may be located at the rightmost among the plurality of space portions 617*a*, 617*b*, and 617*c*.

The crossbar 210, the movable contact part 300, the fixed contact part 400, and the arc chamber 500 may be accommodated in the third space portion 617*c*. In the illustrated implementation, the two arc chambers 500 may be accommodated in the third space portion 617*c*.

Each of the space portions 617*a*, 617*b*, and 617*c* may have the same structure. That is, each of the space portions 617*a*, 617*b*, and 617*c* may have the same shape. Accordingly, arc extinguishing capability in each space portion 617*a*, 617*b*, and 617*c* may be the same.

The arc discharge hole 620 may function as a passage through which an arc generated in the space portion 617 is extinguished and then discharged to the outside. The space portion 617 and the outside of the magnetic contactor 600 can communicate with each other through the arc discharge hole 620.

The arc discharge hole 620 may be formed through the cover portion 610. Specifically, the arc discharge hole 620 may be formed through each of the first side wall 611, the second side wall 612, and the top surface 615.

The arc discharge hole 620 may be provided in plurality. The plurality of arc discharge holes 620 may be spaced apart from one another by predetermined distances. In the illustrated implementation, three arc discharge holes 620 may be formed through each region of the first side wall 611 and the second side wall 612 partitioned by the partition 616.

Accordingly, a total of eighteen arc discharge holes 612 including nine formed through the first side wall 611 and nine formed through the second side wall 612 may be provided. The number of the arc discharge hole 620 may vary.

The arc discharge hole 620 may extend in one direction, namely, in the vertical direction in the illustrated implementation. In other words, one end portion of the arc discharge hole 620 may be located on the top surface 615 and extend in a direction away from the top surface 615 along the first side wall 611 or the second side wall 612.

Another end portion of the arc discharge hole 620, that is, an end portion in a direction away from the top surface 615 may be rounded.

The frame coupling portion 630 may be a portion where the arc box 600 is coupled to the support frame 440. The frame coupling portion 630 may protrude to the outside of the cover portion 610 by a predetermined length.

A fastening member (not illustrated) such as a screw member may be coupled through the frame coupling portion 630. To this end, a through-hole may be formed through the frame coupling portion 630 in the direction toward the support frame 440, that is, in the vertical direction.

The frame coupling portion 630 may be provided in plurality. The plurality of frame coupling portions 630 may be disposed on the cover portion 610. In the illustrated implementation, a total of four frame coupling portions 630 may be provided.

In the illustrated implementation, the frame coupling portions 630 may be located on the front and rear sides of the third side wall 613 and the fourth side wall 614, respectively. The number and shape of the frame coupling portion 630 may vary depending on the shape of the support frame 440.

The crossbar support portion 640 may be a portion to which the fixing portion 213 of the crossbar 210 is coupled. The crossbar support portion 640 may be formed through the top surface 615. The fixing portion 213 of the crossbar 210 may be coupled to the crossbar support portion 640 in a penetrating or inserting manner.

The crossbar support portion 640 may be disposed in a center region among those regions of the top surface 615 partitioned by the partitions 616. The position of the crossbar support portion 640 may change depending on the position of the pillar portion or the fixing portion 213 of the crossbar 210.

The opening 650 may be disposed adjacent to the coupling protrusion 660. The opening 650 may provide a space for forming the coupling protrusion 660.

The opening 650 may be disposed adjacent to the top surface 615. Specifically, the opening 650 may be formed through a portion at which the third side wall 613, the fourth side wall 614, and each partition 616 protrude to the upper side of the top surface 615.

The opening 650 may be disposed adjacent to the coupling protrusion 660. Accordingly, the coupling protrusion 660 may be easily formed inside the cover portion 610.

The opening 650 may be provided in plurality. The plurality of openings 650 may be disposed to surround each of the space portions 617_a_, 617_b_, and 617_c_.

In the illustrated implementation, four openings 650 may be disposed for each of the space portions 617_a_, 617_b_, and 617_c_.

Specifically, the openings 650 disposed to surround the first space portion 617_a_ may include two for the third side wall 613 and two for the partition 616, to be spaced apart from each other by a predetermined distance in the front and rear directions.

The openings 650 disposed to surround the second space portion 617_b_ may include two for each of the two partitions 616, which surround the second space portion 617_b_, to be spaced apart from each other by a predetermined distance in the front and rear directions.

Specifically, the openings 650 disposed to surround the third space portion 617_c_ may include two for the fourth side wall 614 and two for the partition 616, to be spaced apart from each other by a predetermined distance in the front and rear directions.

The number and position of the opening 650 may vary depending on the position of the coupling protrusion 660.

The coupling protrusion 660 may be a portion where the arc chamber 500 is coupled to the arc box 600. The coupling protrusion 660 may be inserted into the arc box coupling hole 512 of the support plate 510. In one implementation, the coupling protrusion 660 may be fitted or snap-fitted to the arc box coupling hole 512.

The coupling protrusion 660 may protrude from the inside of the cover portion 610 toward the space portion 617 by a predetermined length. The coupling protrusion 660 may be provided in plurality. The plurality of coupling protrusions 660 may be located adjacent to the plurality of openings 650, respectively.

Hereinafter, the position of the coupling protrusion 660 will be described in more detail with reference to FIG. 14.

Four coupling protrusions 660 may be located in the first space portion 617_a_ located at the leftmost side. The coupling protrusions 660 may be located on one surface (i.e., right surface) of the third side wall 613 facing the first space portion 617_a_ and one surface (i.e., left surface) of the partition 616 facing the first space portion 617_a_.

Four coupling protrusions 660 may be located in the second space portion 617_b_ located at the center. The coupling protrusions 660 may be located on another surface (i.e., right surface) of the partition 616 surrounding the second space portion 617_b_ at the left side and one surface (i.e., left surface) of the partition 616 surrounding the second space portion 617_b_ at the right side.

Four coupling protrusions 660 may be located in the third space portion 617_c_ located at the rightmost side. The coupling protrusions 660 may be located on another surface (i.e., right surface) of the partition 616 surrounding the third space portion 617_c_ at the left side and one surface (i.e., left surface) of the fourth side wall 614 surrounding the third space portion 617_c_.

The coupling protrusion 660 may be provided in plurality for each side surface of the third side wall 613, the fourth side wall 614, and each partition 616. The plurality of coupling protrusions 660 may be disposed to be spaced apart from one another by predetermined distances.

In the illustrated implementation, two coupling protrusions 660 may be disposed at the predetermined distance from each other on each side surface of the third side wall 613, the fourth side wall 614, and each partition 616.

The arrangement method of the coupling protrusions 660 may result from the number and shape of the arc chamber 500.

That is, two arc chambers 500 may be accommodated in each of the space portions 617_a_, 617_b_, and 617_c_. Each arc chamber 500 may include two support plates 510 and arc box coupling holes 512 formed in the respective support plates 510.

Accordingly, the coupling protrusions 660 formed in each of the space portions 617_a_, 617_b_, and 617_c_ may include two disposed in a direction adjacent to the first side wall 611 (i.e., at the front side), and two disposed in a direction adjacent to the second side wall 612. (i.e., at the rear side).

Meanwhile, the coupling protrusion 660 may have a first surface 661 further inclined toward the support frame 440. That is, the first surface 661 of the coupling protrusion 660 facing the top surface 615 may extend toward the space portion 617 at a predetermined angle with respect to the top surface 615. That is, the first surface 661 may extend obliquely toward the upper side (i.e., toward the top surface 615). In one implementation, the predetermined angle may be an acute angle.

In another implementation, the first surface 661 of the coupling protrusion 660 facing the top surface 615 may extend toward the space portion 617 in parallel to the top surface 615.

A second surface 662 of the coupling protrusion 660 in a direction away from the top surface 615 may extend away from the space portion 617 at a predetermined angle with respect to the top surface 615. That is, the second surface 662 of the coupling protrusion 660 may extend from an end portion of the first surface 661 toward each side surface of the third side wall 613, the fourth side wall 614, and each partition 616.

In one implementation, the predetermined angle may be an acute angle but may be larger than the predetermined angle which is formed between the first surface 661 of the coupling protrusion 660 and the top surface 615.

That is, in the illustrated implementation, the second surface 662 of the coupling protrusion 660 may be inclined downward (i.e., away from the top surface 615).

Accordingly, when the coupling protrusion 660 is inserted into the arc box coupling hole 512, the support plate 510 may be easily moved along the second surface 662 of the coupling protrusion 660 which is inclined.

When the coupling protrusion 660 is inserted into the arc box coupling hole 512, an arbitrary separation of the coupling protrusion 660 from the arc box coupling hole 512 can be prevented by the shape of the first surface 661 of the coupling protrusion 660 which is formed horizontally.

Accordingly, the arc chamber 500 can be easily and firmly coupled to the arc box 600.

The rib portion 670 may support the arc chamber 500 coupled to the arc box 600. The rib portion 670 can prevent the arc chamber 500 from being arbitrarily shaken (moved). This can stably maintain the coupling between the arc chamber 500 and the arc box 600.

The rib portion 670 may be disposed on each of the side walls 613 and 614 and the partition 616 surrounding the space portion 617. The rib portion 670 may protrude from each of the side walls 613 and 614 and the partition 616 toward the space portion 617 by a predetermined length.

As described above, the space portion 617 may include the first to third space portions 617*a*, 617*b*, and 617*c*. Accordingly, the rib portion 670 may also be disposed on each of the first to third space portions 617*a*, 617*b*, and 617*c*).

Specifically, the rib portion 670 located in the first space portion 617*a* may be located on each of one surface (i.e., right surface) of the third side wall 613 facing the first space portion 617*a* and one surface (i.e., left surface) of the partition 616 facing the first space portion 617*a*.

The rib portion 670 may be located on each of another surface (i.e., right surface) of the partition 616 surrounding the second space portion 617*b* at the left side and one surface (i.e., left surface) of the partition 616 surrounding the second space portion 617*b* at the right side.

The rib portion 670 located in the third space portion 617*c* may be located on each of another surface (i.e., right surface) of the partition 616 surrounding the third space portion 617*c* at the left side and one surface (i.e., left surface) of the fourth side wall 614 facing the third space portion 617*c*.

As described above, the two arc chambers 500 may be accommodated in each of the space portions 617*a*, 617*b*, and 617*c*. Accordingly, two rib portions 670 may also be disposed in each of the space portions 617*a*, 617*b*, and 617*c* to be adjacent to the first side wall 611 and the second side wall 612, respectively.

The rib portion 670 may include a first rib portion 671 and a second rib portion 672.

The first rib portion 671 may support the first portion 510*a* of the support plate 510 of the arc chamber 500. Specifically, the first rib portion 671 may support one edge of the first portion 510*a* of the support plate 510 in a direction away from the first side wall 611 or the second side wall 612.

In other words, the first rib portion 671 may support one edge of the first portion 510*a* of the support plate 510 that faces the pillar portion of the crossbar 210.

The first rib portion 671 may be located between the first portion 510*a* and the pillar portion of the crossbar 210. In other words, the first portion 510*a* of the support plate 510 may be located between the first side wall 611 or the second side wall 612 and the first rib portion 671.

The first rib portions 671 may extend across the space portions 617*a*, 617*b*, and 617*c*, respectively.

Specifically, the first rib portion 671 formed in the first space portion 617*a* may extend between the third side wall 613 and the partition 616. The first rib portion 671 formed in the second space portion 617*b* may extend between the adjacent partitions 616. The first rib portion 671 formed in the third space portion 617*c* may extend between the fourth side wall 614 and the partition 616.

The first rib portion 671 may be located closer to the first side wall 611 or the second side wall 612 than the second rib portion 672. In other words, the first rib portion 671 may be located farther from the pillar portion of the crossbar 210 than the second rib portion 672.

This may result from the fact that a width of the first portion 510*a* of the support plate 510 supported by the first rib portion 671 is smaller than a width of the second portion 510*b* of the support plate 510 supported by the second rib portion 672.

The first rib portion 671 may extend by a predetermined length in a direction away from the top surface 615. An extension length of the second rib portion 671 may be shorter than an extension length of the first rib portion 672.

This may result from the fact that the first portion 510*a* of the support plate 510 supported by the first rib portion 671 is located more adjacent to the top surface 615 than the second portion 510*b* of the support plate 510 supported by the second rib portion 672.

Accordingly, since the first portion 510*a* of the support plate 510 is supported by the first rib portion 671, the arc chamber 500 coupled to the arc box 600 may not be randomly shaken (moved).

The second rib portion 672 may support the second portion 510*b* of the support plate 510 of the arc chamber 500. Specifically, the second rib portion 672 may support one edge of the second portion 510*b* of the support plate 510 in a direction away from the first side wall 611 or the second side wall 612.

In other words, the second rib portion 672 may support one edge of the second portion 520*b* of the support plate 510 that faces the pillar portion of the crossbar 210.

The second rib portion 672 may be located between the second portion 510*b* and the pillar portion of the crossbar

210. In other words, the second portion 510*b* of the support plate 510 may be located between the first side wall 611 or the second side wall 612 and the second rib portion 672.

The second rib portions 672 may protrude by predetermined lengths in the space portions 617*a*, 617*b*, and 617*c*, respectively.

Specifically, the second rib portion 672 located in the first space portion 617*a* may be disposed on each of one surface (i.e., right surface) of the third side wall 613 facing the first space portion 617*a* and one surface (i.e., left surface) of the partition 616 facing the first space portion 617*a*.

Also, the second rib portion 672 located in the second space portion 617*b* may be disposed on each of another surface (i.e., right surface) of the partition 616 facing the second space portion 617*b* and one surface (i.e., left surface) of another partition 616 facing the second space portion 617*b*.

In addition, the second rib portion 672 located in the third space portion 617*c* may be disposed on each of another surface (i.e., right surface) of another partition 616 facing the third space portion 617*c* and one surface (i.e., left surface) of the fourth side wall 614 facing the third space portion 617*c*.

The second rib portion 672 may be located farther away from the first side wall 611 or the second side wall 612 than the first rib portion 671. In other words, the second rib portion 672 may be located more adjacent to the pillar portion of the crossbar 210 than the first rib portion 671.

This may result from the fact that a width of the second portion 510*b* of the support plate 510 supported by the second rib portion 672 is larger than a width of the first portion 510*a* of the support plate 510 supported by the first rib portion 671.

The second rib portion 672 may extend by a predetermined length in a direction away from the top surface 615. An extension length of the second rib portion 672 may be longer than an extension length of the first rib portion 671.

This may result from the fact that the second portion 510*b* of the support plate 510 supported by the second rib portion 672 is located farther away from the top surface 615 than the first portion 510*a* of the support plate 510 supported by the first rib portion 671.

Accordingly, since the second portion 510*b* of the support plate 510 is supported by the second rib portion 672, the arc chamber 500 coupled to the arc box 600 may not be randomly shaken (moved).

Figure 4:
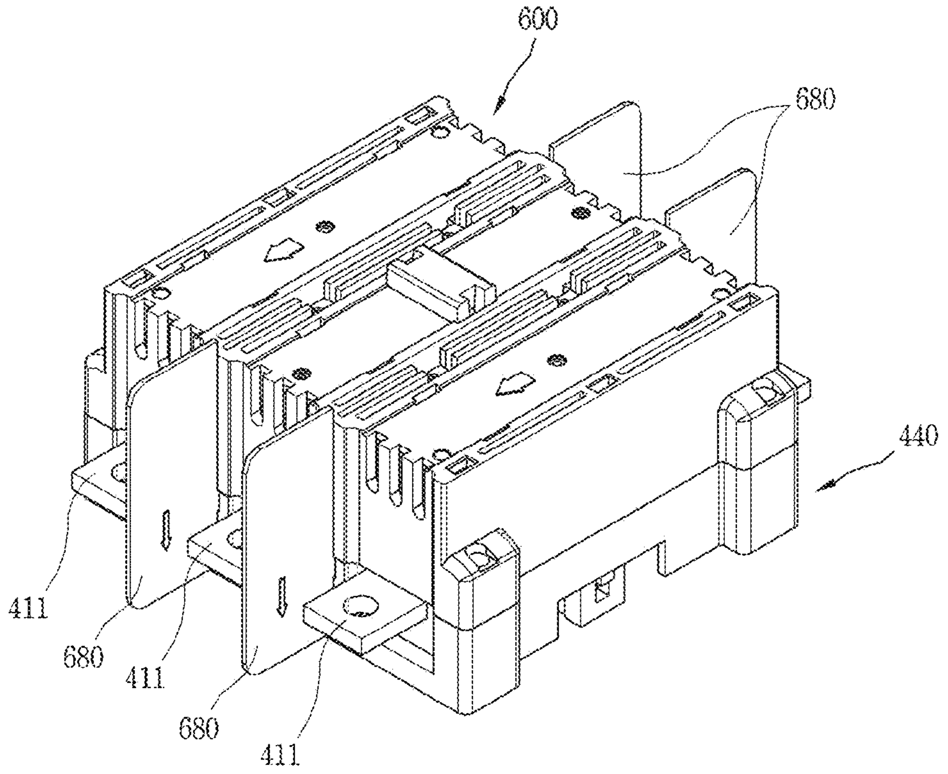
FIG. 4 is a perspective view illustrating a coupled state between a lower frame portion and an arc box provided in the electromagnetic contactor of FIG. 1.
Figure 5:
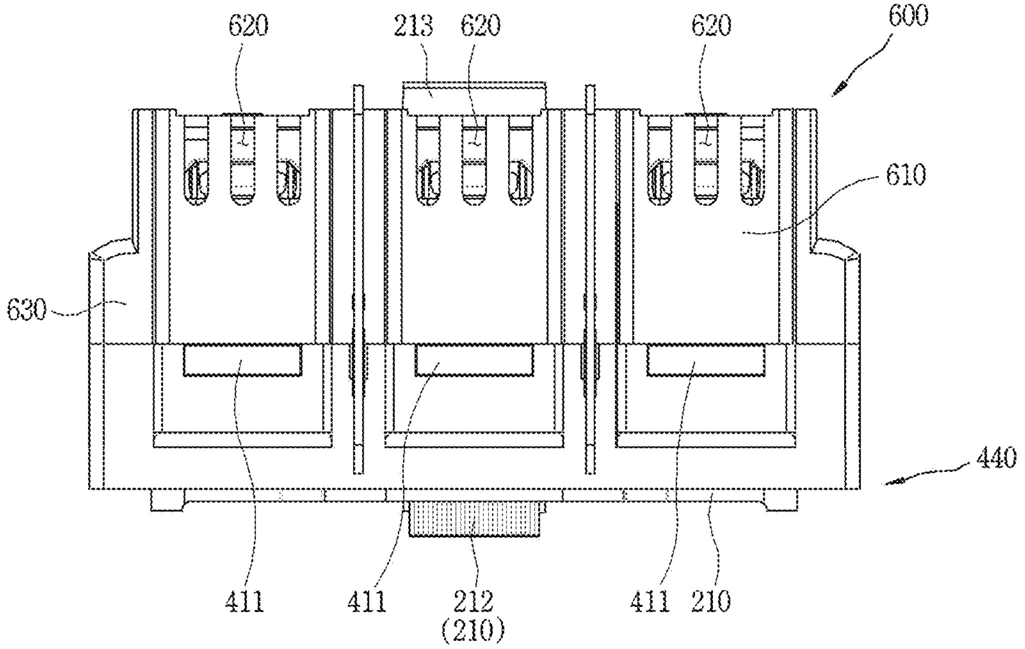
FIG. 5 is a front view illustrating the coupled state between the lower frame portion and the arc box of FIG. 4.
Figure 6:
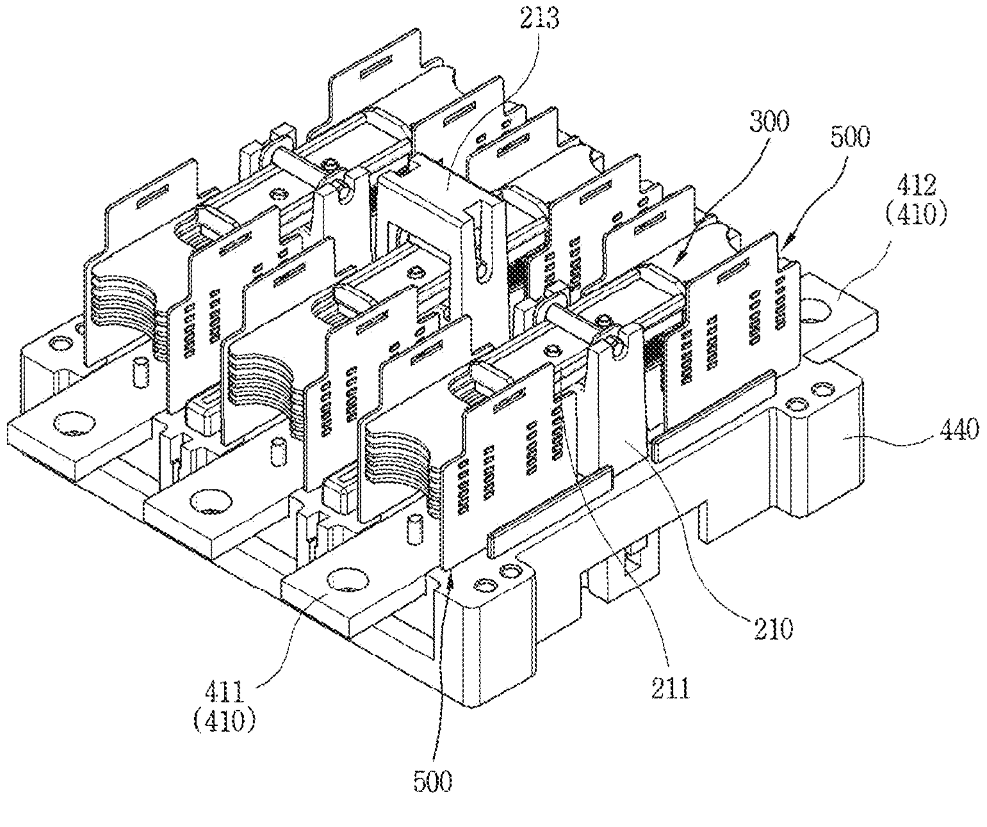
FIG. 6 is a perspective view illustrating a state in which the arc box is open in the state of FIG. 5.
Figure 7:
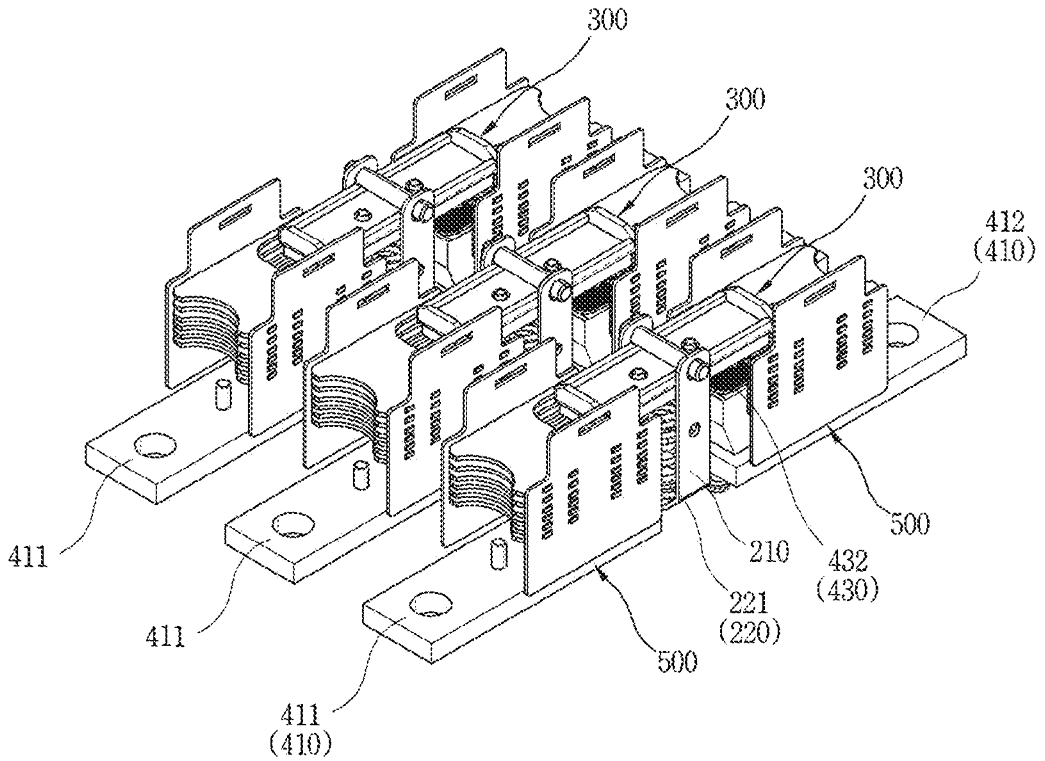
FIG. 7 is a perspective view illustrating a state in which the lower frame portion is open from the state of FIG. 6.
Figure 8:
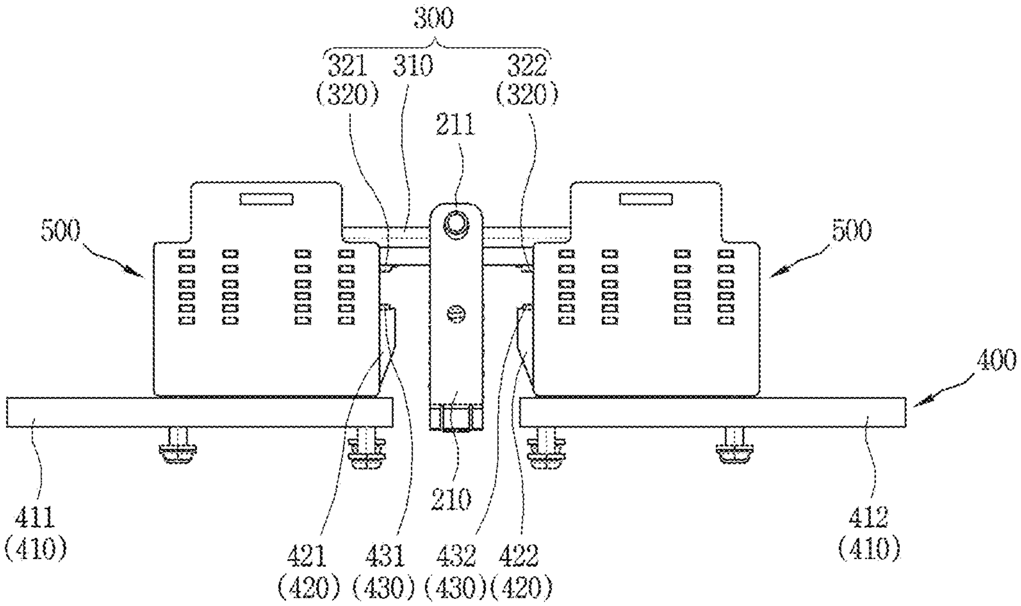
FIG. 8 is a lateral view illustrating the state of FIG. 7.

The blocking wall portion 680 may allow the fixed contact holders 410, which are exposed to the outside of the arc box 600, to be physically spaced apart from each other (see FIG. 4). This can minimize electrical interference that may occur between the fixed contact holders 410 through which currents of different phases are applied.

The blocking wall portion 680 may be provided in plurality. The plurality of blocking wall portions 680 may be disposed to be spaced apart from one another by predetermined distances. Each blocking wall portion 680 may be located between the adjacent fixed contact holders 410.

In the electromagnetic contactor 10 according to the implementation, three fixed contact holders 410 may protrude from each of the first side wall 611 and the second side wall 612. Accordingly, two blocking wall portions 680 may be disposed on each of the first side wall 611 and the second side wall 612.

The blocking wall portion 680 may extend to the outside of the arc box 600 by a predetermined length. An extension length of the blocking wall portion 680 may preferably be longer than a length by which the fixed contact holder 410 protrudes from each side wall 611, 612.

The blocking wall portion 680 may be formed of a non-conductive material. In one implementation, the blocking wall portion 680 may be formed of a synthetic resin.

5. Description of Coupling Relationship Between Arc Chamber 500 and Arc Box 600 According to Implementation The electromagnetic contactor 10 according to the implementation may include the arc box coupling hole 512 and the coupling protrusion 660. The arc box coupling hole 512 and the coupling protrusion 660 may be coupled to each other in the fitting or snapping manner, such that the arc chamber 500 can be easily coupled to the arc box 600.

In addition, the arc box 600 may include the rib portion 670. The rib portion 670 may support the arc chamber 500 coupled to the arc box 600. This can stably maintain the coupled state between the arc chamber 500 and the arc box 600.

Figure 16:
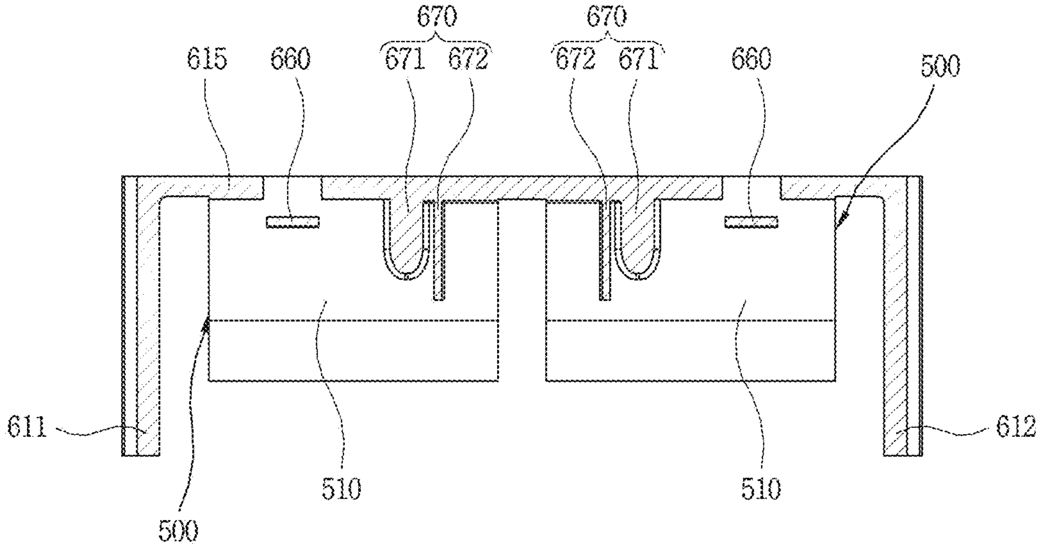
FIG. 16 is a cross-sectional view illustrating the arc box of FIG. 13, taken along the line A-A'.
Figure 17:
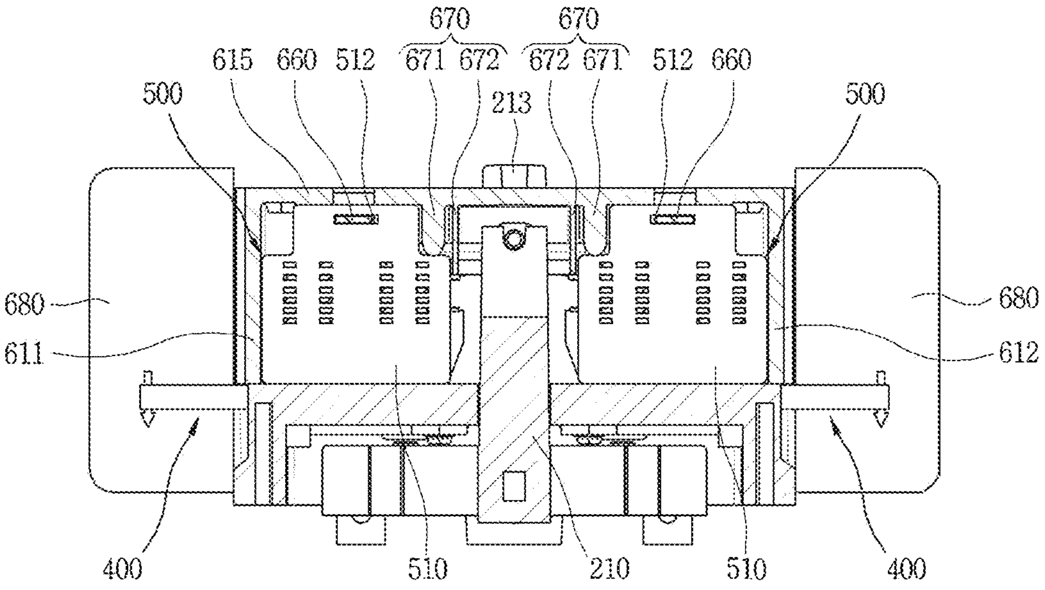
FIG. 17 is a cross-sectional view illustrating a coupled state between an arc chamber and an arc box in accordance with an implementation.

Hereinafter, the coupling relationship between the arc chamber 500 and the arc box 600 according to the implementation will be described in detail, with reference to FIGS. 16 and 17.

The arc chamber 500 may be coupled to the arc box 600. Each of the space portions 617*a*, 617*b*, and 617*c* of the arc box 600 may accommodate two arc chambers 500.

The coupling protrusion 660 may be coupled to the arc box coupling hole 512 of the arc chamber 500.

As described above, the first surface 661, that is, an upper surface of the coupling protrusion 660 facing the top surface 615 may extend toward the space portion 617 at a predetermined angle with each side wall 613, 614 or the partition 616. In one implementation, the predetermined angle may be a right angle.

In addition, the second surface 662, that is, a lower surface of the coupling protrusion 660, may extend from the first surface 661 toward each side wall 613, 614 or the partition 616 at a predetermined angle with the first surface 661. In this case, the predetermined angle may be an acute angle.

That is, a cross-section of the coupling protrusion 660 may be formed in the shape of a right-angled triangle or an obtuse-angled triangle forming a hypotenuse on which the second surface 662 is inclined downward.

Accordingly, the arc chamber 500 can be easily moved in a direction toward the top surface 615, that is, in a direction in which the coupling protrusion 660 is inserted into the arc box coupling hole 512.

On the other hand, when the coupling protrusion 660 is inserted into the arc box coupling hole 512, an arbitrary separation of the arc chamber 500 from the arc box 600 can be prevented by virtue of the shape of the first surface 661 of the coupling protrusion 660.

This can facilitate the arc chamber 500 and the arc box 600 to be firmly coupled to each other.

Also, the arc chamber 500 coupled to the arc box 600 may be supported by the rib portion 670.

At this time, one edge of the first portion 510*a* of the support plate 510 located on the upper side may be supported by the first rib portion 671. Specifically, the first rib portion 671 may support one edge of the first portion 510*a* disposed in a direction away from each of the side walls 611 and 612.

Since the width of the first portion 510*a* is smaller than the width of the second portion 510*b*, the first rib portion 671 may be located more adjacent to each of the side walls 611 and 612 than the second rib portion 672.

In addition, one edge of the second portion 510*b* of the support plate 510 may be supported by the second rib portion 672. Specifically, the second rib portion 672 may support the one edge of the second portion 510*b* disposed in a direction away from each of the side walls 611 and 612.

Since the width of the second portion 510*b* is larger than the width of the first portion 510*a*, the second rib portion 672 may be located farther away from each of the side walls 611 and 612 than the first rib portion 671.

Accordingly, in the arc chamber 500 coupled to the arc box 600, the first portion 510*a* and the second portion 510*b* can be supported by the first rib portion 671 and the second rib portion 672, respectively. Therefore, any shaking of the arc chamber 500 coupled to the arc box 600 can be prevented.

Furthermore, even when an arc is generated in the space portion 617, since the rib portion 670 contacts and supports the support plate 510, the shaking of the arc chamber 500 can be minimized.

Although it has been described above with reference to the preferred implementations of the present disclosure, it will be understood that those skilled in the art are able to variously modify and change the present disclosure without departing from the scope of the invention described in the claims below.

10: Magnetic contactor
100: Frame
110: Base portion
120: Lower frame portion
200: Driving part
210: Crossbar
211: Contact holder connection portion
212: Movable core
213: Fixing portion
220: Elastic member
221: First elastic member
222: Second elastic member
300: Movable contact part
310: Movable contact holder
320: Movable contact
321: First movable contact
322: Second movable contact
400: Fixed contact part
410: Fixed contact holder
411: First fixed contact holder
412: Second fixed contact holder
420: Fixed contact block
421: First fixed contact block
422: Second fixed contact block
430: Fixed contact
431: First fixed contact
432: Second fixed contact
440: Support frame
500: Arc chamber
510: Support plate
510*a*: First portion
510*b*: Second portion
511: Grid coupling hole
512: Arc box coupling hole
520: Grid
521: Plate portion
522: Wing portion
523: Contact accommodating portion
524: Insertion protrusion
600: Arc box
610: Cover portion
612: First side wall
612: Second side wall
613: Third side wall
614: Fourth side wall
615: Top surface
616: Partition
616*a: Buffer portion*
617: Space portion
617*a*: First space portion
617*b*: Second space portion
617*c*: Third space portion
620: Arc discharge hole
630: Frame coupling portion
640: Crossbar support portion
650: Upper aperture
660: Coupling protrusion
661: First surface
662: Second surface
670: Rib portion
671: First rib portion
672: Second rib portion
680: Blocking wall portion

The invention claimed is:

1. An arc box comprising:
a space accommodating an arc chamber;
a plurality of side walls surrounding the space and continuously formed with one another; and
a partitioning member disposed inside the space to partition the space into plural regions,
wherein the plurality of side walls comprise:
a first side wall and a second side wall extending in a first direction and disposed to face each other; and
a third side wall and a fourth side wall that are continuous with the first side wall and the second side wall, respectively, extend in a second direction different than the first direction, and are disposed to face each other,
wherein the partitioning member is located between the third side wall and the fourth side wall and extends between the first side wall and the second side wall, and
wherein a coupling member to which the arc chamber is coupled protrudes toward the space from at least one of one side surface of the third side wall, one side surface of the fourth side wall, and one side surface of the partitioning member facing the space,
wherein the coupling member comprises:
a first surface extending at a first predetermined angle with respect to the at least one of the one side surface of the third side wall, the one side surface of the fourth side wall, and one side surface of the partitioning member from which the coupling member protrudes; and
a second surface extending from an end portion of the first surface toward the at least one of the one side surface of the third side wall, the one side surface of the fourth side wall, and the one side surface of the partitioning member, and
wherein the second surface extends at a second predetermined angle with respect to the first surface, and the second predetermined angle is an acute angle.

2. The arc box of claim 1, further comprising a rib portion protruding inward toward the space from the at least one of the one side surface of the third side wall, the one side surface of the fourth side wall, and the one side surface of the partitioning member facing the space so as to support the arc chamber,
wherein the rib portion is located adjacent to the arc chamber.

3. The arc box of claim 2, wherein the rib portion is disposed such that a distance between the rib portion and the first side wall or the second side wall is longer than a distance between the arc chamber and the first side wall or the second side wall.

4. An arc box comprising:

a space accommodating an arc chamber;

a plurality of side walls surrounding the space and continuously formed with one another; and a partitioning member disposed inside the space to partition the space into plural regions, wherein the plurality of side walls comprise:

a first side wall and a second side wall extending in a first direction and disposed to face each other; and a third side wall and a fourth side wall that are continuous with the first side wall and the second side wall, respectively, extend in a second direction different than the first direction, and are disposed to face each other, wherein the partitioning member is located between the third side wall and the fourth side wall and extends between the first side wall and the second side wall, and wherein a coupling member to which the arc chamber is coupled protrudes toward the space from at least one of one side surface of the third side wall, one side surface of the fourth side wall, and one side surface of the partitioning member facing the space, and wherein the coupling member comprises:

a first surface extending at a predetermined angle with respect to the at least one of the one side surface of the third side wall, the one side surface of the fourth side wall, and the one side surface of the partitioning member from which the coupling member protrudes; and a second surface extending from an end portion of the first surface to be downwardly inclined toward the at least one of the one side surface of the third side wall, the one side surface of the fourth side wall, and the one side surface of the partitioning member.

5. An electromagnetic contactor comprising:

a fixed contact fixed to a support frame;

a movable contact located adjacent to the fixed contact to be brought into contact with or separated from the fixed contact;

an arc box having a space for accommodating the fixed contact and the movable contact therein; and an arc chamber accommodated in the space of the arc box and located adjacent to the fixed contact and the movable contact, wherein the arc box comprises:

a plurality of side walls partially surrounding the space and disposed to face each other; and coupling members protruding from the plurality of side walls, respectively, toward the space, and wherein the arc chamber comprises:

a plurality of grids stacked with being spaced apart from each other by a predetermined distance;

support plates coupled to both end portions of the grids; and coupling holes formed through the support plates such that the coupling members are inserted, and wherein the plurality of side walls comprise:

a first side wall and a second side wall extending in a first direction and disposed to face each other; and a third side wall and a fourth side wall that are continuous with the first side wall and the second side wall, respectively, extend in a second direction different than the first direction, and are disposed to face each other, and wherein each of the coupling members comprises:

a first surface extending toward the third side wall or the fourth side wall; and a second face continuous with the first surface and extending toward the third side wall or the fourth side wall.

6. The electromagnetic contactor of claim 5, wherein the second surface extends obliquely in a direction toward the fixed contact.

7. The electromagnetic contactor of claim 5, wherein the arc box comprises a partitioning member extending between the first side wall and the second side wall in the space to partition the space into plural regions, wherein the partitioning member is provided in a plurality of partitioning members spaced apart from each other by a predetermined distance between the third side wall and the fourth side wall, and wherein the coupling members are disposed on one side surface of the third side wall, one side surface of the fourth side wall, and one side surface of each of the plurality of partitioning members facing the partitioned space.

8. The electromagnetic contactor of claim 7, wherein the arc chamber is provided in a plurality of arc chambers, the plurality of arc chambers being disposed in the space to be spaced apart from each other by a predetermined distance in a direction in which the partitioning member extends, and wherein the coupling member is provided in a plurality of coupling members, the plurality of coupling members being disposed in the space to be spaced apart from each other by a predetermined distance in a direction in which the partitioning member extends.

9. An electromagnetic contactor comprising:

a fixed contact fixed to a support frame;

a movable contact located adjacent to the fixed contact to be brought into contact with or separated from the fixed contact;

an arc box having a space for accommodating the fixed contact and the movable contact therein; and an arc chamber accommodated in the space of the arc box and located adjacent to the fixed contact and the movable contact, wherein the arc box comprises:

a plurality of side walls partially surrounding the space and disposed to face each other; and coupling protrusions protruding from the plurality of side walls, respectively, toward the space, and wherein the arc chamber comprises:

a plurality of grids stacked with being spaced apart from each other by a predetermined distance;

support plates coupled to both end portions of the grids; and coupling holes formed through the support plates such that coupling members are inserted, and wherein the plurality of side walls comprise:

a first side wall and a second side wall extending in a first direction and disposed to face each other; and a third side wall and a fourth side wall that are continuous with the first side wall and the second side wall, respectively, extend in a second direction different than the first direction, and are disposed to face each other, and wherein the third side wall and the fourth side wall are provided with rib portions, wherein the rib portions are located adjacent to the arc chamber and protrude inward toward the space.

10. The electromagnetic contactor of claim 9, wherein each of the support plates comprises:

a first portion located away from the fixed contact; and a second portion continuous with the first portion and located adjacent the fixed contact, and wherein a width of the first portion is narrower than a width of the second portion.

11. The electromagnetic contactor of claim 10, wherein the rib portions comprise:

a first rib portion located adjacent to one edge of the first portion; and a second rib portion located adjacent to one edge of the second portion, wherein a distance between the one edge of the first portion and the first rib portion is shorter than a distance between the one edge of the first portion and the second rib portion.

12. The electromagnetic contactor of claim 9, wherein the arc chamber is provided in a plurality of arc chambers that are disposed adjacent to the first side wall and the second side wall, respectively, in the space, and wherein a rib portion of the rib portions associated with a given arc chamber of the plurality of arc chambers is located farther from the first side wall or the second side wall than the arc chamber.

* * * * *